(12) United States Patent
Li et al.

(10) Patent No.: US 11,405,844 B2
(45) Date of Patent: Aug. 2, 2022

(54) DATA ROUTING METHOD AND TERMINAL

(71) Applicant: Huawei Technologies Co., Ltd., Shenzhen (CN)

(72) Inventors: Yanbing Li, Beijing (CN); Jiwu Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/909,423

(22) Filed: Jun. 23, 2020

(65) Prior Publication Data

US 2020/0322867 A1    Oct. 8, 2020

Related U.S. Application Data

(63) Continuation of application No. PCT/CN2018/099125, filed on Aug. 7, 2018.

(30) Foreign Application Priority Data

Dec. 29, 2017   (CN) .......................... 201711475083.X

(51) Int. Cl.
*H04W 40/02* (2009.01)
*H04L 45/00* (2022.01)
*H04W 40/24* (2009.01)
*H04W 48/18* (2009.01)

(52) U.S. Cl.
CPC ............. *H04W 40/02* (2013.01); *H04L 45/70* (2013.01); *H04W 40/24* (2013.01); *H04W 48/18* (2013.01)

(58) Field of Classification Search
CPC ... H04W 28/16; H04W 72/048; H04W 12/08; H04W 16/24; H04W 24/02
See application file for complete search history.

(56) References Cited

U.S. PATENT DOCUMENTS

| | | | | |
|---|---|---|---|---|
| 2009/0165141 A1* | 6/2009 | Kakehi | .................... | G06F 21/10 726/26 |
| 2012/0011288 A1* | 1/2012 | Kanaya | ................. | G06F 13/385 710/36 |
| 2012/0030674 A1* | 2/2012 | Mundkur | ............ | G06F 13/4022 718/1 |
| 2014/0019663 A1* | 1/2014 | Ishii | ........................ | G06F 13/28 710/308 |

(Continued)

FOREIGN PATENT DOCUMENTS

| | | |
|---|---|---|
| CN | 102025598 A | 4/2011 |
| CN | 101695160 B | 5/2012 |

(Continued)

OTHER PUBLICATIONS

Kang, 2017, Vivo Mobile Communication, US 20210092634 A1_CN109257769_Machine Translation.*

(Continued)

*Primary Examiner* — Khaled M Kassim
*Assistant Examiner* — Berhanu D Belete
(74) *Attorney, Agent, or Firm* — Conley Rose, P.C.

(57) ABSTRACT

A data routing method includes obtaining a target identifier of a received target data packet, determining a target network interface card corresponding to the target identifier, and sending the target data packet using the target network interface card.

20 Claims, 11 Drawing Sheets

(56) References Cited

U.S. PATENT DOCUMENTS

| | | | |
|---|---|---|---|
| 2014/0095687 A1* | 4/2014 | Zhong | H04L 67/02 709/223 |
| 2014/0365703 A1* | 12/2014 | Yamaguchi | G06F 13/4027 710/306 |
| 2015/0201312 A1 | 7/2015 | Tjahjono et al. | |
| 2015/0269116 A1* | 9/2015 | Raikin | B01J 35/04 709/212 |
| 2016/0360476 A1* | 12/2016 | Kim | H04W 48/18 |
| 2017/0303259 A1* | 10/2017 | Lee | H04W 12/08 |
| 2017/0339609 A1 | 11/2017 | Youn et al. | |
| 2018/0041428 A1 | 2/2018 | Wan et al. | |
| 2019/0098618 A1* | 3/2019 | Lee | H04W 12/08 |
| 2019/0124181 A1* | 4/2019 | Park | H04W 74/0833 |
| 2019/0124704 A1 | 4/2019 | Sun et al. | |
| 2020/0146077 A1* | 5/2020 | Li | H04W 76/10 |
| 2020/0178196 A1* | 6/2020 | Wang | H04W 48/18 |
| 2020/0413244 A1* | 12/2020 | Park | H04W 76/18 |
| 2021/0092634 A1* | 3/2021 | Kang | H04W 28/0247 |

FOREIGN PATENT DOCUMENTS

| | | |
|---|---|---|
| CN | 103167483 A | 6/2013 |
| CN | 104753791 A | 7/2015 |
| CN | 105577502 A | 5/2016 |
| CN | 105721314 A | 6/2016 |
| CN | 106572517 A | 4/2017 |
| CN | 107211048 A | 9/2017 |
| CN | 107295609 A | 10/2017 |
| CN | 107318113 A | 11/2017 |
| CN | 107517488 A | 12/2017 |
| LU | 92843 B1 | 5/2017 |
| WO | 2014044689 A1 | 3/2014 |

OTHER PUBLICATIONS

3GPP TS 23.501 V15.0.0, "3rd Generation Partnership Project; Technical Specification Group Services and System Aspects; System Architecture for the 5G System; Stage 2 (Release 15)," Dec. 2017, Dec. 2017, 181 pages.

3GPP TS 23.501 V0.3.1, 3rd Generation Partnership Project;Technical Specification Group Services and System Aspects;System Architecture for the 5G System;Stage 2(Release 15), Mar. 2017, 97 pages.

S2-171528, Motorola Mobility, et al., "23.501: UE Traffic Routing," SA WG2 Meeting #119, Feb. 13-17, 2017, Dubrovnik, Croatia, 7 pages.

S2-178438, Oppo, "UE Route Selection Policy",SA WG2 Meeting #124 Nov. 27-Dec. 1, 2017, Reno, Nevada, USA,total 9 pages.

S2-178890, Huawei, "23.503: Clarification on URSP," SA WG2 Meeting #124, Nov. 24-Dec. 1, 2017, Reno, Nevada, USA, 13 pages.

* cited by examiner

DATA ROUTING METHOD AND TERMINAL

CROSS-REFERENCE TO RELATED APPLICATIONS

This application is a continuation of International Patent Application No. PCT/CN2018/099125, filed on Aug. 7, 2018, which claims priority to Chinese Patent Application No. 201711475083.X, filed on Dec. 29, 2017, both of which are hereby incorporated by reference in their entireties.

TECHNICAL FIELD

This application relates to the field of communications technologies, and in particular, to a data routing method and a terminal.

BACKGROUND

The concept of network slice (NS) is proposed in a 5th-generation mobile communications technology (5G) standard, and means that a network of an operator may be divided into a plurality of network slices based on a user group or a service type. Each network slice may include one or more data networks (DNs). A terminal may simultaneously access a plurality of network slices, the terminal may establish communication connections to a plurality of DNs, and a link of each communication connection corresponds to one network interface card (NIC) on the terminal. In this way, there is a problem of how the terminal is supposed to select an NIC for data sending when sending uplink data.

A technical solution used in other approaches is that an application program vendor modifies an application program such that the application program corresponds to a network interface card on a terminal. When data of the application program needs to be sent, the terminal may query a NIC corresponding to the application program. In this case, uplink data may be sent using the NIC corresponding to the application program.

However, because there are a large quantity of application program vendors, it is difficult for all the application program vendors to modify an application program. Consequently, it cannot be effectively ensured that data of each application program can be successfully sent, and an application program of a particular version cannot be bound to a NIC. Consequently, in a 5G environment, an application program cannot send data.

SUMMARY

To resolve a problem of how a terminal routes a data packet sent by each program when the terminal simultaneously accesses a plurality of DNs corresponding to at least one network slice, embodiments of the present disclosure provide a data routing method and a terminal.

A first aspect of the embodiments of the present disclosure provides a data routing method, including the following steps.

Step A. A terminal obtains a target identifier carried in a target data packet, where the target identifier is an identifier corresponding to a target program, and the target program is used to generate the target data packet. In this embodiment, before the target data packet of the target program is routed, the target identifier may be set in the target data packet such that the target identifier carried in the target data packet may be obtained when the target data packet needs to be routed.

Step B. The terminal determines a target NIC that corresponds to the target identifier and that has a data transmission function, where the target NIC corresponds to a target data network, the target data network belongs to a target network slice, and a service type supported by the target network slice corresponds to a service type of a session initiated by the target program. The target NIC is a functional entity built in the terminal. Specifically, the virtual NIC is a virtual interface connected to a transmission control protocol/internet protocol (TCP/IP) and a modem, and the target NIC corresponds to the target program.

Step C. The terminal sends the target data packet to the target data network using the target NIC. Therefore, the target data network can correspondingly process the target data packet such that the target DN can serve the target program.

Beneficial effects of this aspect are as follows. When accessing a plurality of DNs based on a requirement of a service type, the terminal may determine a path on which the target data packet of the target program is sent such that the target data packet of the target program can be accurately sent to the target data network that can serve the target program, in a process of routing the target data packet, a complex change to code of the target program is not needed, and modification in code of a core library of an operating system is also avoided, in other words, a program manufacturer can send a data packet of a program to a corresponding target data network without making a change to the program, effectively ensuring that the data packet is successfully sent.

With reference to the first aspect of the embodiments of the present disclosure, in an optional implementation of the embodiments of the present disclosure, in a process of determining the target NIC that corresponds to the target identifier and that has the data transmission function, step B further includes obtaining a target routing table corresponding to the target identifier, where the target routing table includes a correspondence between the target NIC and a target network element, which is specifically that the target routing table includes a correspondence between an identifier of the target NIC and an identifier of the target network element. In addition, different routing tables correspond to different programs installed on the terminal. In a process in which the terminal sends the target data packet to the target data network using the target NIC, step C further includes sending the target data packet to the target network element using the target NIC, where the target network element is configured to forward the target data packet to the target data network. Specifically, the target network element included in the target routing table is obtained from the target routing table, after receiving the target data packet, the target network element may forward the target data packet to the target data network configured to process the target data packet.

Beneficial effects of this aspect are as follows. The terminal may determine a target routing table corresponding to any target program run by the terminal. In this case, the terminal may determine, based on the target routing table, the path on which the target data packet of the target program is sent such that the target data packet of the target program can be accurately sent to the data network that can serve the target program, and the data packet can be successfully sent based on the target routing table without a complex change to the code of the target program.

With reference to the first aspect of the embodiments of the present disclosure, in an optional implementation of the embodiments of the present disclosure, before step A in which the terminal obtains the target identifier carried in the target data packet is performed, the method further includes the following steps.

Step A01. The terminal receives the target data packet sent by the target program. Step A02. The terminal determines the target identifier corresponding to the target program. Different programs installed on the terminal one-to-one correspond to different identifiers. Step A03. The terminal sets the target identifier in a descriptor of the target data packet. Specifically, the descriptor of the target data packet includes a target field, and the target field is specially used to record a marked value. In this case, the terminal may record the target identifier in the target field.

Beneficial effects of the method shown in this aspect are as follows. Step A01 to step A03 are preprocessing on the target data packet before routing. By means of the preprocessing before routing, the terminal may set the target identifier in the descriptor of the target data packet. Therefore, when routing the target data packet, the terminal can accurately determine, based on the target identifier, a routing table that can route the target data packet, to improve accuracy of sending the target data packet to the target data network, and reduce table lookup difficulty because the target identifier is shorter than the user identifier (UID), thereby improving efficiency of querying a corresponding target routing table based on the target identifier.

With reference to the first aspect of the embodiments of the present disclosure, in an optional implementation of the embodiments of the present disclosure, a specific process of step A02 in which the terminal determines the target identifier corresponding to the target program is as follows.

Step A021. The terminal obtains a target UID carried in the target data packet. Specifically, the terminal may obtain a name of the target program, determine a user identifier corresponding to the name of the target program, and determine the user identifier corresponding to the name of the target program as the target identifier. Step A022. The terminal obtains, based on a first correspondence, the target identifier corresponding to the target user identifier UID, where the first correspondence includes correspondences between user identifiers UIDs of different programs and different identifiers.

Beneficial effects of the method shown in this aspect are as follows. Because the target identifier is shorter than the user identifier, table lookup difficulty is effectively reduced, to improve efficiency of querying the corresponding target routing table based on the target identifier, thereby improving efficiency of routing the target data packet based on the target routing table to send the target routing table to the target data network.

With reference to the first aspect of the embodiments of the present disclosure, in an optional implementation of the embodiments of the present disclosure, before step B of determining the target NIC that corresponds to the target identifier and that has the data transmission function is performed, the method further includes a process of creating the target routing table. Details are as follows.

Step B11. The terminal receives a terminal route selection policy list, where the terminal route selection policy list indicates that there is at least one network slice, and any one of the at least one network slice includes at least one data network. Step B12. The terminal determines the target network slice and the target data network based on the terminal route selection policy list. Specifically, the terminal may first obtain the name of the target program, and the terminal may determine, based on the Universal Software Radio Peripheral (URSP) list, slice information (slice info) corresponding to the name of the target program. The slice info may include at least one network slice. The terminal may select, from the at least one network slice, one network slice as a target network slice corresponding to a type of the target program. The route selection policy list further includes a plurality of DNs corresponding to the name of the target program. In this case, the terminal may select one data network from the plurality of DNs as the target data network to serve the target data packet. Step B13. The terminal determines the target network element corresponding to the target data network. Specifically, the terminal may send indication information to a core network side, where the indication information includes a name of the target data network selected by the terminal, and the core network side may send an address of the target network element to the terminal based on the indication information. Step B14. Determine the target NIC corresponding to the target network element. Step B15. Create the target routing table based on the correspondence between the target NIC and the target network element.

According to this aspect, the terminal may create the target routing table used to route the target data packet, then, after obtaining the target identifier carried in the target data packet, the terminal may determine the corresponding target routing table based on the target identifier, and the terminal may route the target data packet based on the target routing table to send the target data packet to the target data network, in a process of performing routing based on the target routing table, a complex change to code of the target program is not needed, thereby effectively ensuring that the data packet is successfully sent.

A second aspect of the embodiments of the present disclosure provides a data routing apparatus, including an identifier obtaining module configured to obtain a target identifier carried in a target data packet, where the target identifier is an identifier corresponding to a target program, and the target program is used to generate the target data packet, and the identifier obtaining module is configured to perform step A in the first aspect of the embodiments of the present disclosure, a searching module configured to determine a target NIC that corresponds to the target identifier and that has a data transmission function, where the target NIC corresponds to a target data network, the target data network belongs to a target network slice, and a service type supported by the target network slice corresponds to a service type of a session initiated by the target program, and the searching module is configured to perform step B in the first aspect of the embodiments of the present disclosure, and the target NIC configured to send the target data packet to the target data network. The target NIC is configured to perform step C in the first aspect of the embodiments of the present disclosure.

Beneficial effects of this aspect are as follows. When accessing a plurality of DNs based on a requirement of a service type, the data routing apparatus may determine a path on which the target data packet of the target program is sent such that the target data packet of the target program can be accurately sent to the target data network that can serve the target program, in a process of routing the target data packet, a complex change to code of the target program is not needed, and modification in code of a core library of an operating system is also avoided, in other words, a program manufacturer can send a data packet of a program to a corresponding target data network without making a change to the program, effectively ensuring that the data packet is successfully sent.

According to the second aspect of the embodiments of the present disclosure, in an optional implementation, the identifier obtaining module is further configured to obtain a target routing table corresponding to the target identifier, where the target routing table includes a correspondence between the target NIC and a target network element, and the target NIC is further configured to send the target data packet to the target network element, and the target network element is configured to forward the target data packet to the target data network.

Beneficial effects of this aspect are as follows. The data routing apparatus may determine a target routing table corresponding to any target program run by the terminal. In this case, the data routing apparatus may determine, based on the target routing table, the path on which the target data packet of the target program is sent such that the target data packet of the target program can be accurately sent to the data network that can serve the target program, and the data packet can be successfully sent based on the target routing table without a complex change to the code of the target program.

According to the second aspect of the embodiments of the present disclosure, in an optional implementation, the data routing apparatus further includes a first receiving module configured to receive the target data packet sent by the target program, a first determining module configured to determine the target identifier corresponding to the target program, and a setting module configured to set the target identifier in a descriptor of the target data packet.

Beneficial effects of the data routing apparatus shown in this aspect are as follows. The data routing apparatus may perform preprocessing on the target data packet before routing. By means of the preprocessing before routing, the data routing apparatus may set the target identifier in the descriptor of the target data packet. Therefore, when routing the target data packet, the data routing apparatus can accurately determine, based on the target identifier, a routing table that can route the target data packet, to improve accuracy of sending the target data packet to the target data network, and reduce table lookup difficulty because the target identifier is shorter than the user identifier, thereby improving efficiency of querying a corresponding target routing table based on the target identifier.

According to the second aspect of the embodiments of the present disclosure, in an optional implementation, the first determining module includes a first obtaining module configured to obtain a target user identifier UID carried in the target data packet, and a second obtaining unit configured to obtain, based on a first correspondence, the target identifier corresponding to the target user identifier UID, where the first correspondence includes correspondences between user identifiers UIDs of different programs and different identifiers.

Beneficial effects of the data routing apparatus shown in this aspect are as follows. Because the target identifier is shorter than the user identifier, table lookup difficulty is effectively reduced, to improve efficiency of querying the corresponding target routing table based on the target identifier, thereby improving efficiency of routing the target data packet based on the target routing table to send the target routing table to the target data network.

According to the second aspect of the embodiments of the present disclosure, in an optional implementation, the data routing apparatus further includes a second receiving module configured to receive a terminal route selection policy list, where the terminal route selection policy list indicates that there is at least one network slice, and any one of the at least one network slice includes at least one data network, a second determining module configured to determine the target network slice and the target data network based on the terminal route selection policy list, a third determining module configured to determine the target network element corresponding to the target data network, a fourth determining module configured to determine the target NIC corresponding to the target network element, and a creation module configured to create the target routing table based on the correspondence between the target NIC and the target network element.

According to this aspect, the data routing apparatus may create the target routing table used to route the target data packet, then, after obtaining the target identifier carried in the target data packet, the data routing apparatus may determine the corresponding target routing table based on the target identifier, and the data routing apparatus may route the target data packet based on the target routing table to send the target data packet to the target data network, in a process of performing routing based on the target routing table, a complex change to code of the target program is not needed, thereby effectively ensuring that the data packet is successfully sent.

A third aspect of the embodiments of the present disclosure provides a terminal, including a processor and a memory, where the memory stores a computer-readable program, and the processor runs the program in the memory to complete the method shown in the first aspect of the embodiments of the present disclosure.

A fourth aspect of the embodiments of the present disclosure provides a computer-readable storage medium, including an instruction, where when the instruction is run on a terminal or a processor, the terminal or the processor is enabled to perform the method shown in the first aspect of the embodiments of the present disclosure.

A fifth aspect of the embodiments of the present disclosure provides a computer program product including an instruction, where when the computer program product is run on a terminal or a processor, the terminal or the processor is enabled to perform the method shown in the first aspect of the embodiments of the present disclosure.

The embodiments of the present disclosure disclose a data routing method and a terminal. The terminal shown in the embodiments may access, based on a requirement of a service type, a plurality of DNs corresponding to at least one network slice, and the terminal determines the corresponding target NIC using the target identifier carried in the target data packet. In this case, the terminal may send, using the target NIC, the target data packet to the data network that can serve the target data packet. Therefore, when the terminal accesses the plurality of DNs, the target data packet can be accurately sent to the corresponding data network without a complex change to code of a program.

DESCRIPTION OF EMBODIMENTS

To better understand a data routing method shown in this application, the following first describes, using an example, a communications system to which the data routing method shown in this application is applied.

Figure 1:
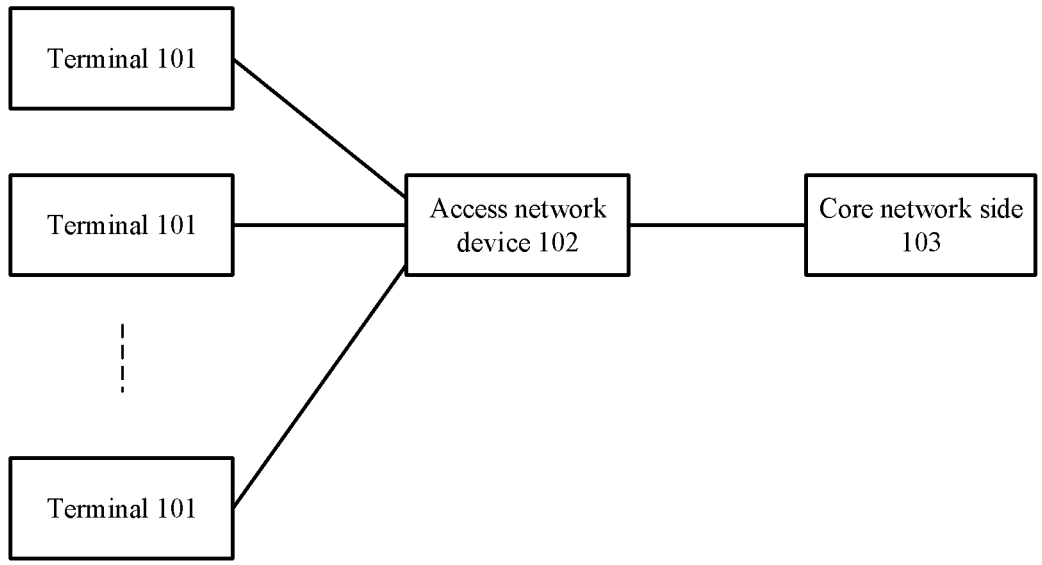
FIG. 1 is a schematic structural diagram of an embodiment of a communications system according to the present disclosure.

The following describes a structure of the communications system with reference to an embodiment shown in FIG. 1. FIG. 1 is a schematic structural diagram of an embodiment of a communications system according to the present disclosure. The communications system in this embodiment includes a terminal 101, an access network device 102, and a core network side 103. The terminal 101 in this embodiment may access a cell of the access network device 102, and communicate with the access network device 102.

The terminal 101 in this embodiment may be any terminal such as a mobile phone, a tablet computer, a personal digital assistant (PDA), or a vehicle-mounted computer. The access network device 102 in this embodiment corresponds to different devices in different systems. In this embodiment, an example in which the access network device 102 is applied to a 5G system is used. In this case, the access network device 102 corresponds to a new radio NodeB (gNB).

The core network side 103 may include different network elements in different systems.

The access network device 102 in FIG. 1 may be connected to the terminal 101. Optionally, the access network device 102 may be connected to a plurality of terminals 101. The access network device 102 may be connected to the core network side 103. The terminal 101 and the core network device 103 need to communicate with each other using the access network device 102.

Figure 2:
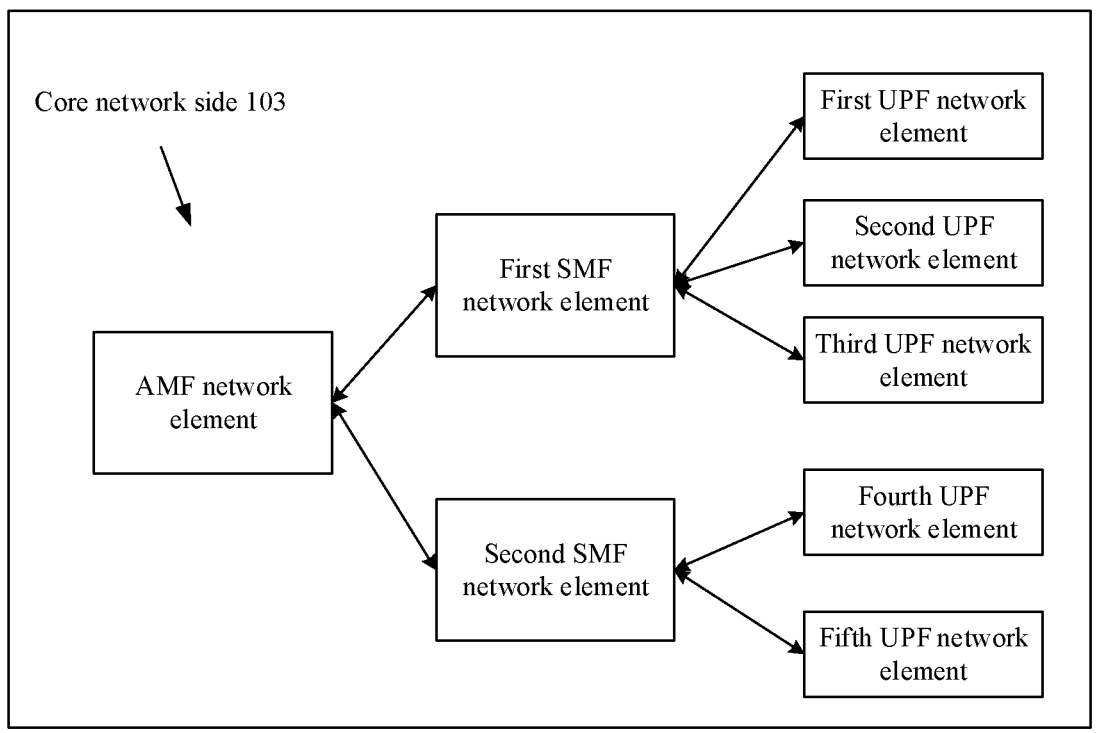
FIG. 2 is a schematic structural diagram of an embodiment of a core network side according to the present disclosure.

The following describes, using an example with reference to FIG. 2, a specific network element and a network slice that are included on a core network side shown in this application.

In this embodiment, using an example in which the network element included on the shown core network side is applied to 5G, 5G services are diversified and include an internet of vehicles, a large-scale internet of things, industrial automation, telemedicine, and the like. These services have different requirements on networks. For example, industrial automation requires low latency and high reliability, but does not require a high data rate, a high-definition video does not require ultra-low latency but requires an ultra-high rate, some large-scale internets of things do not require handover, and some mobility management is a waste of signaling for the large-scale internets of things, and so on. Therefore, a physical network needs to be divided into a plurality of virtual networks.

A virtual network is considered as a "network slice". Each network slice is independent of each other. A network function of each network slice is customized and managed based on a service scenario. It may be understood that one network slice corresponds to one or more particular services. A session currently performed by a terminal has a plurality of service types, and a session of a different service type needs a network slice corresponding to the service type to provide a service.

The core network side 103 serves sessions of different service types performed by the terminal. Therefore, as shown in FIG. 2, the core network side 103 includes at least one authentication management function (AMF) network element, at least one session management function (SMF) network element, and at least one user plane function (UPF) network element.

Specifically, the AMF network element is responsible for mobility and access management of the terminal. One AMF network element may support one or more network slices of different service types, and different AMF network elements may support network slices of different service types. Each SMF network element is located in a network slice instance. In an embodiment, one SMF network element corresponds to a network slice supported by one AMF network element, and one AMF network element may establish communication connections with a plurality of SMF network elements.

Optionally, one SMF network element may be connected to a plurality of AMF network elements. In addition, one SMF network element may be connected to a plurality of UPF network elements, and one UPF network element may be connected to one SMF network element. In this case, one SMF network element may manage and control a plurality of UPF network elements, and one UPF network element is managed and controlled by one SMF. The UPF network element may establish a connection to an access network device, to implement data transmission related to the terminal.

The following describes the core network side 103 using an example with reference to FIG. 2. The core network side 103 in this embodiment includes one AMF network element, the AMF network element may establish connections to two SMF network elements, and the two SMF network elements connected to the AMF network element are a first SMF network element and a second SMF network element.

Network slices supported by the AMF network element include a first network slice and a second network slice, the first network slice has a first network slice type, and the second network slice has a second network slice type. The first SMF network element is an SMF network element corresponding to the first network slice, and the second SMF network element is an SMF network element corresponding to the second network slice. Optionally, the network slice corresponding to the first SMF network element may also be described as a network slice in which the first SMF network element is located, and the network slice corresponding to the second SMF network element may also be described as a network slice in which the second SMF network element is located. Optionally, a same network slice type may correspond to a plurality of network slice instances. Therefore, the first network slice type may correspond to a plurality of network slice instances, and the second network slice type may also correspond to a plurality of network slice instances. Therefore, the first network slice corresponding to the first SMF network element may also be described as a network slice instance corresponding to the first SMF network element, and the second network slice corresponding to the second SMF network element may also be described as a network slice instance corresponding to the second SMF network element.

As shown in FIG. 2, the first SMF network element manages a first UPF network element, a second UPF network element, and a third UPF network element. The second SMF network element manages a fourth UPF network element and a fifth UPF network element. Each UPF network element is configured to establish a connection to one or more access network devices 102, to implement data transmission related to the terminal.

Specifically, there are service sessions of a plurality of service types in the terminal, for example, an enhanced mobile broadband service (eMBB), ultra-reliable low-latency communication (URLLC), and massive machine-type communication (mMTC). Service sessions of different service types may correspond to different network slices. Even a service type may correspond to different network slices because the service type is provided by different operators or service providers. In this way, when the terminal 101 requests to establish a session, the terminal 101 sends indication information to the core network side using the access network device 102, where the indication information is used to indicate a network slice needed by a session initiated by the terminal 101. The core network side 103 determines, based on the indication information, the network slice indicated by the indication information such that the network slice determined by the core network side 103 can serve the terminal.

It can be learned from the foregoing descriptions that the network slice in this embodiment is a virtual network. Therefore, one network slice corresponds to at least one type of particular session service of the terminal 101. Any session service run by the terminal may be a session based on the network slice. For example, the session may be a packet data unit (PDU) session.

Figure 3A:
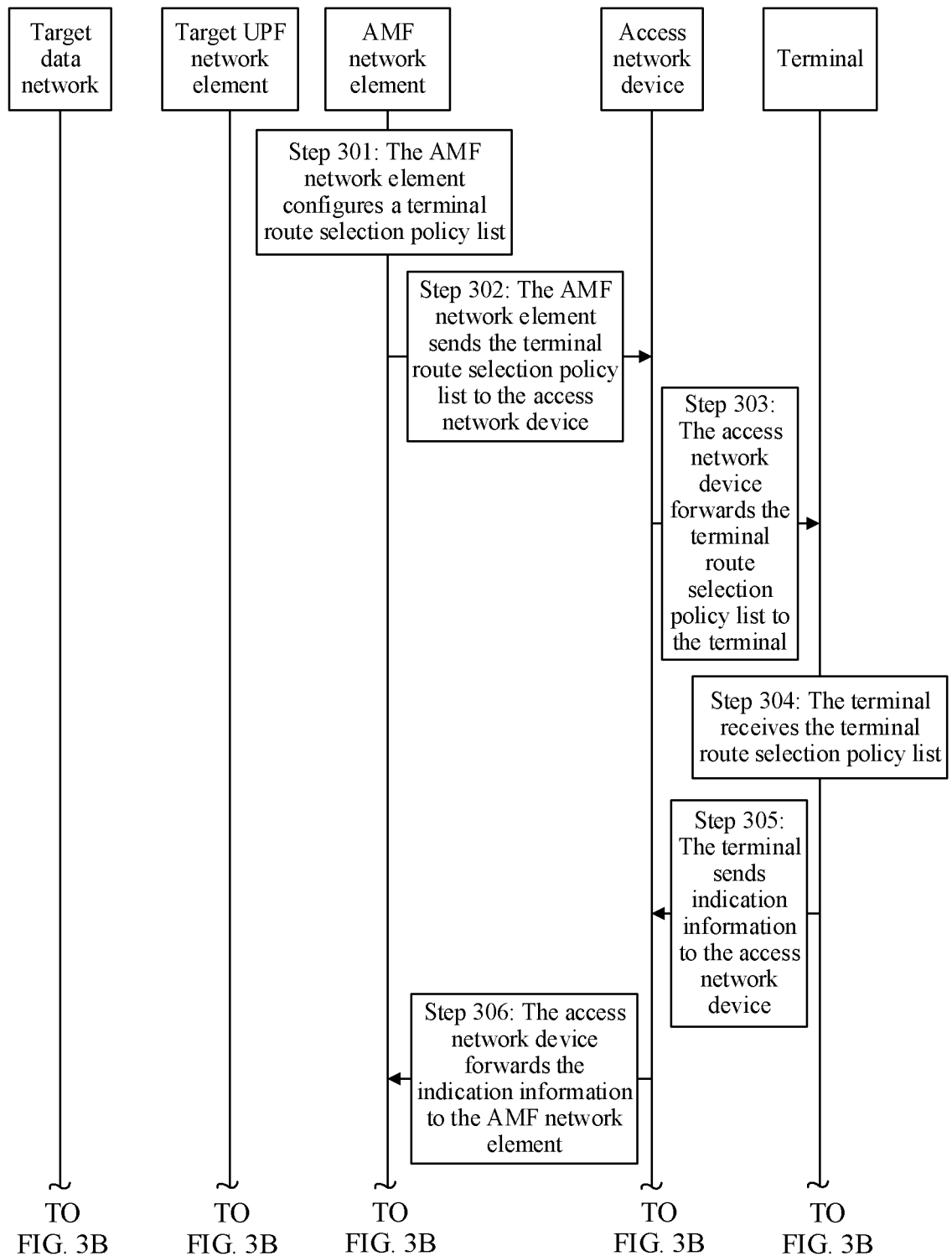
FIG. 3A, FIG. 3B, and FIG. 3C are a flowchart of steps of an embodiment of a data routing method according to the present disclosure.
Figure 3B:
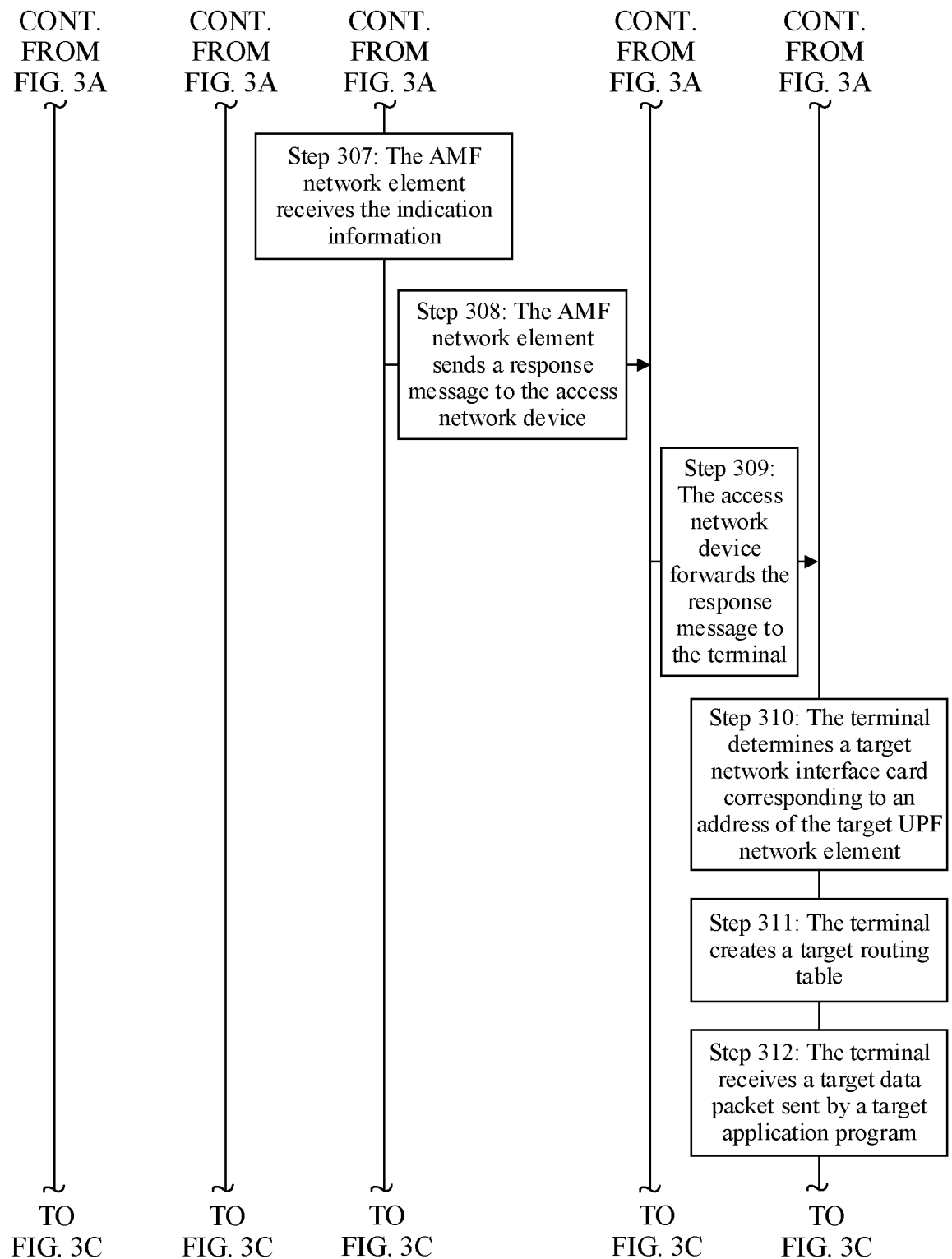
Figure 3C:
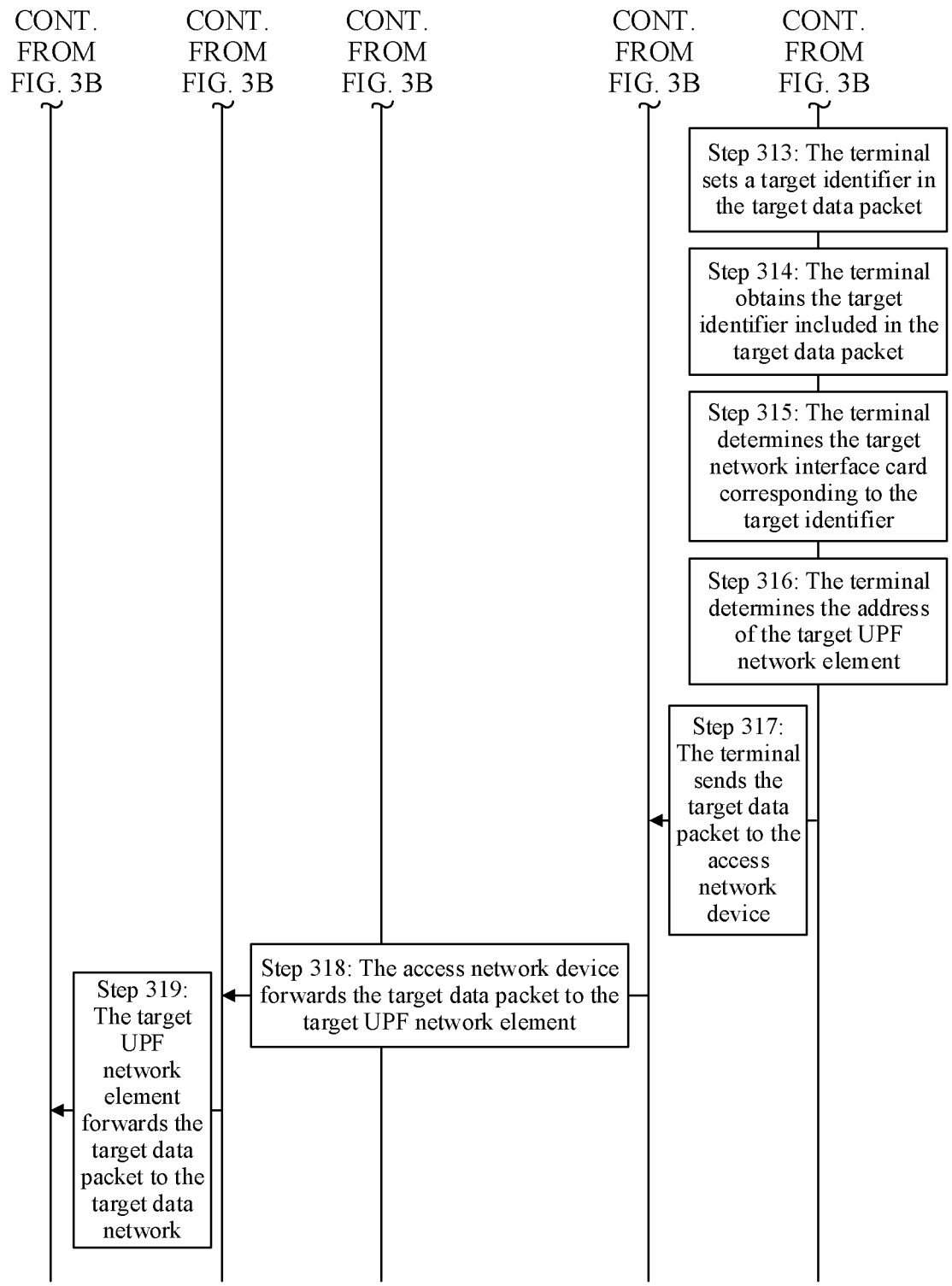

The following describes a data routing method shown in this application using an example with reference to FIG. 3A, FIG. 3B, and FIG. 3C. FIG. 3A, FIG. 3B, and FIG. 3C are a flowchart of steps of an embodiment of a data routing method according to the present disclosure. Step 301. An AMF network element configures a terminal route selection policy list. For content included in the terminal route selection policy (UE route selection policy, URSP) list in this embodiment, refer to the following. The URSP list may include a traffic filter, and the traffic filter is a data stream filtering condition, and a data stream that meets the data stream filtering condition needs to use the URSP list. The traffic filter in this embodiment may be a name of an application program.

The URSP list may further include non-seamless offload, and the non-seamless offload is used to indicate whether a data stream that meets the traffic filter filtering condition can be offloaded to a non-3rd Generation Partnership Project (3GPP) network for access. For example, the non-3GPP access may be WI-FI access.

Specifically, the non-seamless offload in this embodiment may include the following three values.

One value is "Prohibited", where "Prohibited" is used to indicate that offloading of data traffic from 3GPP access to non-3GPP access is prohibited.

One value is "Preferred", where "Preferred" is used to indicate that data traffic is preferentially offloaded from 3GPP access to non-3GPP access.

One value is "Permitted", where "Permitted" is used to indicate that data traffic is allowed to be offloaded from 3GPP access to non-3GPP access.

The URSP list may further include slice info, and the slice info is used to indicate a network slice to which a data stream that meets a filtering condition can be sent. In other words, a correspondence between a data stream of an application program and a network slice is set using the slice info. Specifically, the slice info may include one or more pieces of Single Network Slice Selection Assistance Information (S-NSSAI). More specifically, the S-NSSAI is an identifier of a network slice. Optionally, the slice info in this embodiment may include a plurality of pieces of S-NSSAI.

The URSP list may further include a service continuity type, and the continuity type is used to indicate a service and session continuity (SSC) mode. The SSC mode is used to establish a session between the core network side and the terminal. For example, the SSC mode is used to establish a PDU session between the core network side and the terminal.

The URSP list may further include a data network name (DNN), and the DNN is used to indicate a DN to which a data stream that meets a filtering condition can be sent. Specifically, the URSP list may include one or more DNNs.

The URSP list may further include an access network type (Access Type), and the access type may be used to indicate 3GPP access and non-3GPP access.

Step 302. The AMF network element sends the terminal route selection policy list to the access network device. Step 303. The access network device forwards the terminal route selection policy list to the terminal. Specifically, the AMF network element may add the URSP list to a registration accept message such that the terminal obtains the URSP list by parsing the registration accept message when the AMF network element sends the registration accept message to the terminal. Alternatively, the AMF network element may add the URSP list to a configuration update command message such that the terminal obtains the URSP list by parsing the configuration update command message when the AMF network element sends the configuration update command message to the terminal. Descriptions about sending, by the AMF, the URSP list in this embodiment is an optional example, and does not impose a limitation, provided that the AMF network element can send the URSP list to the terminal.

Step 304. The terminal receives the terminal route selection policy list. Step 305. The terminal sends indication information to the access network device. Step 306. The access network device forwards the indication information to the AMF network element. The indication information in this embodiment is used to request an address of a target network element from the AMF network element. The target network element is configured to forward a data packet sent by a target application program to a target data network configured to process the target data packet. The target data network implements a function corresponding to a target slice. For example, the target data network may be an Internet Protocol (IP) multimedia subsystem (IMS) run by an operator, to support fixed access and mobile access. The target network element is a forwarding device that forwards related data to the target data network, for example, may be a UPF network element. Specifically, the target application program is any application program installed on the terminal.

In this embodiment, after receiving the URSP list, the terminal may parse the URSP list. This embodiment uses the URSP list received by the terminal shown in Table 1 an example.

TABLE 1

| Rule ID | Rule content | |
|---|---|---|
| 0 | Traffic filter | com.example.app0 |
|   | Non-seamless offload | Prohibited |
|   | Slice info | Slice 0 |
|   | Continuity types | SSC mode 3 |
|   | DNN | DNN 0 |
|   | Access type | 3GPP |
| 1 | Traffic filter | com.example.app1 |
|   | Non-seamless offload | Prohibited |
|   | Slice info | Slice 0 |
|   | Continuity types | SSC mode 3 |
|   | DNN | DNN 1 |
|   | Access type | 3GPP |
| 2 | Traffic filter | com.example.app2 |
|   | Non-seamless offload | Prohibited |
|   | Slice info | Slice 1 |
|   | Continuity types | SSC mode 3 |
|   | DNN | DNN 0 |
|   | Access type | 3GPP |

As shown in Table 1, the URSP list includes correspondences between different identifiers (IDs) and different list content, and the list content includes but is not limited to Traffic filter, Non-seamless offload, slice info, Continuity Types, DNN, and Access Type. For specific descriptions of the list content, refer to the foregoing descriptions. Details are not described again.

The terminal may first obtain a name of the target application program. If the terminal determines that the name of the target application program is com.example.app0, the terminal may determine, based on the URSP list, slice info corresponding to the name of the target application program. The slice info may include at least one network slice. If the slice info includes a plurality of network slices, because the target application program of the terminal needs to access only one DN in one network slice, the terminal may select one network slice from the plurality of network slices included in the slice info.

Optionally, the terminal may select, based on a priority sequence of the plurality of network slices included in the slice info, a network slice with a highest priority as a target network slice. This embodiment uses an example in which an identifier of the target network slice selected by the terminal is a slice 0. Specifically, priorities of the plurality of network slices are sequenced based on the URSP list. In an embodiment, in the plurality of network slices included in the URSP list, a network slice ranked first has a highest priority, and a network slice ranked last has a lowest priority, or vice versa. A specific sequencing manner is not limited in this embodiment.

The terminal may further determine, based on the URSP list, a target DNN corresponding to the name of the target application program. A target DN having the target DNN is used to serve the target application program, in other words, the target DN is used to process a data packet sent by the target application program. The URSP list may include at least one DNN. If the URSP list includes a plurality of DNNs, the terminal may select one DNN from the plurality of DNNs included in the URSP list as the target DNN. Optionally, the terminal may select, based on a priority sequence of the plurality of DNNs included in the URSP list, a DNN with a highest priority as the target DNN. This embodiment uses an example in which the target DNN selected by the terminal is a DNN 0. Specifically, priorities of the plurality of DNNs are sequenced based on the URSP list. In an embodiment, in the plurality of DNNs included in the URSP list, a DNN ranked first has a highest priority, and a DNN ranked last has a lowest priority, or vice versa. A specific sequencing manner is not limited in this embodiment.

It can be learned that, as described above, the terminal may establish a correspondence shown in Table 2. The correspondence shown in Table 2 is a correspondence among the name of the target application program, an identifier of the target network slice, and the target DNN.

TABLE 2

| Target app name | Identifier of target network slice | Target DNN |
|---|---|---|
| com.example.app0 | Slice 0 | DNN 0 |
| com.example.app1 | Slice 0 | DNN 1 |
| com.example.app2 | Slice 1 | DNN 0 |

The terminal may generate the indication information based on the determined correspondence shown in Table 2. Specifically, the indication information includes a name of the target DN. In other words, the indication information includes the target DNN. It can be learned that in this embodiment, the terminal indicates, to the AMF network element using the indication information including the target DNN, a service type of a session service initiated by the target application program.

Optionally, specific content included in the indication information is not limited in this embodiment, provided that the AMF network element can determine, based on the received indication information, the target DN that is selected by the terminal and that has the target DNN. For example, the indication information may further include S-NSSAI corresponding to the name of the target application program and information used to establish a connection between the terminal and the target DN.

Step 307. The AMF network element receives the indication information. The AMF network element may establish a connection relationship between the terminal and the target DN based on the indication information such that the target DN can serve the target application program on the terminal based on a supported service type.

Step 308. The AMF network element sends a response message to the access network device. Step 309. The access network device forwards the response message to the terminal. Specifically, the AMF network element may send the response message to the terminal, and the response message includes an address of the target network element corresponding to the target DN. More specifically, the address of the target network element in this embodiment may be an IP address of the target network element. The target network element is not limited in this embodiment, provided that the target network element can forward the target data packet of the target application program to the target DN. This embodiment uses an example in which the target network element is a target UPF network element for description.

Step 310. The terminal determines the target NIC corresponding to the address of the target UPF network element. The NIC is a functional entity built in the terminal. Specifically, the virtual NIC is a virtual interface that connects a TCP/IP stack and a modem, and each PDU session initiated by the terminal corresponds to one NIC. In addition, the NIC is a driver. In this embodiment, the target NIC determined by the terminal is configured to transmit data to the corresponding target UPF network element.

Specifically, when the terminal receives the address of the target UPF network element included in the response message, the terminal may create the target NIC corresponding to the target UPF network element, and then the terminal may create a correspondence listed in Table 3. The correspondence listed in Table 3 includes a correspondence among the identifier of the target network slice, the target DNN, an identifier of the target NIC, and an identifier of the target UPF network element that correspond to the name of the target application program.

TABLE 3

| Target network slice | Target DNN | Identifier of target NIC | Identifier of target UPF network element |
| --- | --- | --- | --- |
| Slice 0 | DNN 0 | NIC0-0 | GateWay0-0 |
| Slice 0 | DNN 1 | NIC0-1 | GateWay0-1 |
| Slice 1 | DNN 0 | NIC1-0 | GateWay1-0 |

It can be learned that the terminal establishes a correspondence between any target application program installed on the terminal and the identifier of the target network slice, the identifier of the target NIC, and the identifier of the target UPF network element shown in Table 3.

More specifically, when the terminal determines the target UPF network element, the terminal may determine the target NIC corresponding to the target UPF network element, and may further create a correspondence between the identifier of the target UPF network element such as "GateWay0-0" and the identifier of the target NIC such as "NIC0-0" shown in Table 3.

Step 311. The terminal creates a target routing table. The terminal creates an identifier corresponding to the target application program. The identifier is not limited in this embodiment, provided that the identifier corresponds to the target application program. It can be learned that, using the method in this embodiment, a unique correspondence between the identifier and any application program installed on the terminal can be created. The identifier corresponding to the target application program is not limited in this embodiment. The target identifier may be any character. In an embodiment, the identifier in this embodiment may be any letter, digit, character, or symbol, provided that the target identifier corresponds to the target application program. The target routing table includes a correspondence between the target NIC and the target UPF network element. More specifically, the target routing table in this embodiment includes the correspondence between the identifier of the target NIC and the identifier of the target UPF network element. It can be learned that, in step 311 in this embodiment, the terminal may create a plurality of routing tables, and different routing tables correspond to different application programs installed on the terminal.

Step 312. The terminal receives the target data packet sent by the target application program. In this embodiment, when the target application program installed on the terminal runs, the target application program may generate the target data packet. For example, if the target application program is WECHAT installed on the terminal, the target data packet may be information sent by WECHAT. For another example, if the target application program is an email application program installed on the terminal, the target data packet may be an email sent by the email application program, or the like. Details are not described in this embodiment.

Step 313. The terminal sets the target identifier in a descriptor of the target data packet. The terminal may determine the target routing table corresponding to the target application program, and then the terminal may set the target identifier in the descriptor of the target data packet based on the target identifier corresponding to the target application program and the target routing table.

Step 301 to step 313 in this embodiment are preprocessing before routing. By means of the preprocessing before routing, the terminal may set the target identifier in the descriptor of the target data packet. Steps below describe the following process in detail. After receiving the target data packet sent by the target application program, the terminal routes the target data packet based on the target identifier, to send the target data packet to the target DN that can process the target data packet.

Step 314. The terminal obtains the target identifier included in the target data packet. In this embodiment, when the target data packet needs to be routed, the terminal may extract the target identifier from the descriptor of the target data packet. Step 315. The terminal determines the target NIC corresponding to the target identifier. When obtaining the target identifier in the descriptor of the target data packet sent by the target application program, the terminal may determine the target routing table corresponding to the target identifier, and then the terminal may determine the target NIC included in the target routing table. Specifically, the target routing table includes the identifier of the target NIC such that the terminal determines the target NIC based on the identifier of the target NIC.

A specific process in which the terminal determines the target routing table corresponding to the target identifier may be as follows. If different routing tables created by the terminal have different sequence numbers, the terminal may create correspondences between sequence numbers of different routing tables and different identifiers. In this case, when the terminal determines the target identifier, the terminal may determine a target sequence number corresponding to the target identifier, and the terminal may determine that a routing table with the target sequence number is the target routing table. Alternatively, a specific process in which the terminal determines the target routing table corresponding to the target identifier may be as follows. Different routing tables created by the terminal include identifiers corresponding to different application programs. In this case, when the terminal determines the target identifier, the terminal may determine that a routing table including the target identifier is the target routing table.

Step 316. The terminal determines the address of the target UPF network element. The terminal determines, based on the target routing table, the address of the target UPF network element corresponding to the target NIC. Specifically, if the target routing table includes the identifier of the target UPF network element, when the terminal determines the target routing table, the terminal may determine the target UPF network element based on the identifier of the target UPF network element included in the target routing table such that the terminal determines the address of the target UPF network element.

Step 317. The terminal sends the target data packet to the access network device. Step 318. The access network device forwards the target data packet to the target UPF network element. Specifically, the terminal may send the target data packet to the target UPF network element based on the address of the target UPF network element using the target NIC of the terminal.

Step 319. The target UPF network element forwards the target data packet to the target data network. Specifically, after receiving the target data packet, the target UPF network element may forward the target data packet to the target DN such that the target DN can correspondingly process the target data packet, and the target DN can serve the target application program.

Beneficial effects of using the method in this embodiment are as follows. The method in this embodiment is implemented based on a driver of the terminal. When accessing a plurality of DNs based on a requirement of a service type, the terminal may determine a target routing table corresponding to any target application program run by the terminal. In this case, the terminal may determine, based on the target routing table, a path on which the target data packet of the target application program is sent, to accurately send the target data packet of the target application program to the DN that can serve the target application program. In addition, using the method in this embodiment, a complex change to code of the target application program is not needed, and modification in code of a core library of an operating system is also avoided, in other words, an application program manufacturer can send a data packet of an application program to a corresponding DNN without making a change to the application program, effectively ensuring that the data packet is successfully sent.

Figure 4A:
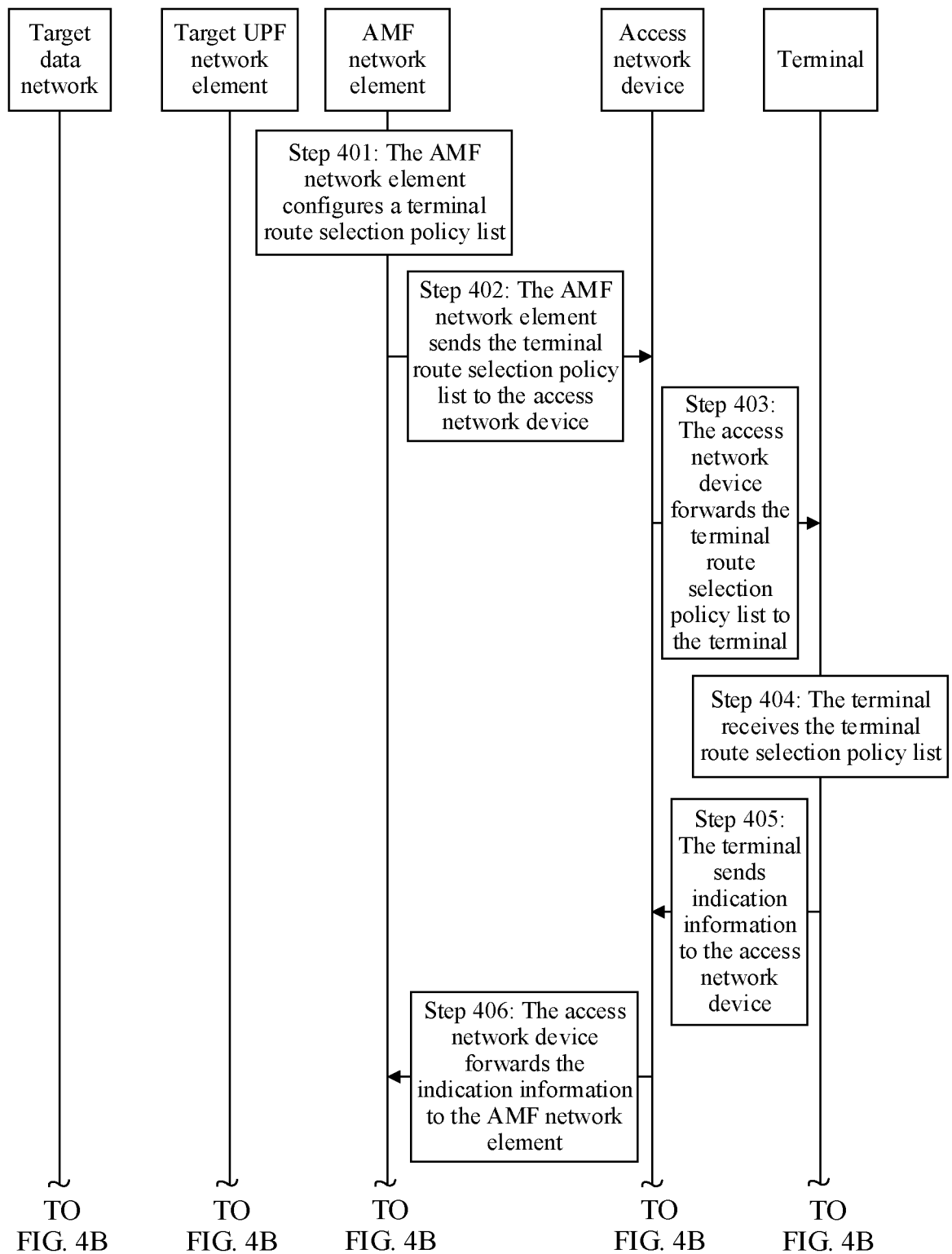
FIG. 4A, FIG. 4B, and FIG. 4C are a flowchart of steps of an application scenario of a data routing method according to the present disclosure.
Figure 4B:
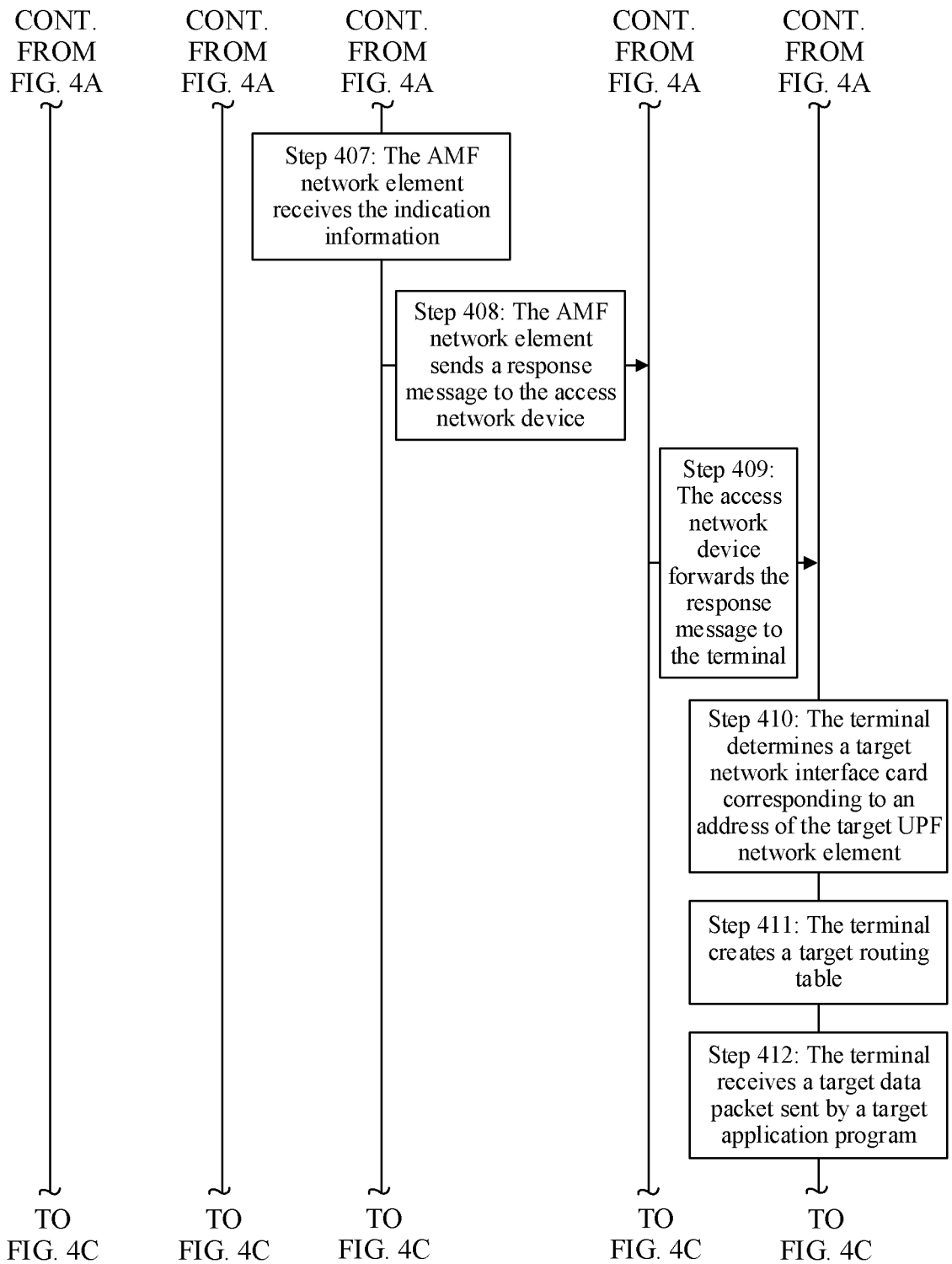
Figure 4C:
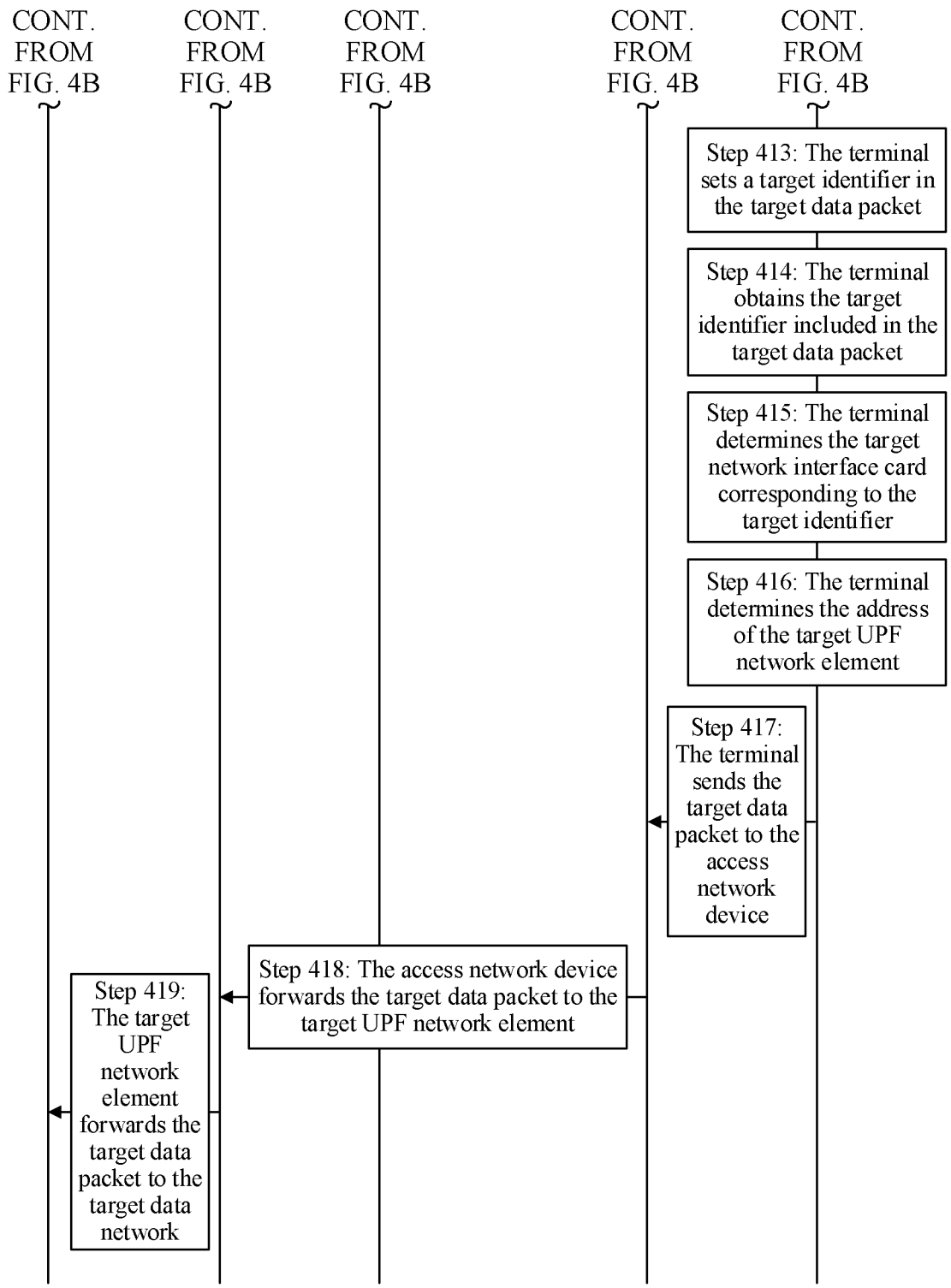

To better understand the method in this embodiment of the present disclosure, the following describes the data routing method shown in this application using an example with reference to an application scenario shown in FIG. 4A, FIG. 4B, and FIG. 4C. FIG. 4A, FIG. 4B, and FIG. 4C are a schematic diagram of steps of an application scenario of a data routing method according to the present disclosure. According to the method shown in this application, a terminal route selection policy list can be applied to an ANDROID system run on a terminal, to route an uplink data packet. Details are as follows.

For a specific execution process of step 401 to step 410 in this application scenario, refer to step 301 to step 310 shown in FIG. 3A, FIG. 3B, and FIG. 3C. Details are not described in this application scenario.

Specifically, this application scenario is described using an example in which a PDU session may be established between the terminal and the target DN.

Step 411. The terminal creates a target routing table (as shown in the following Table 7 to Table 9). In this application scenario, when the terminal needs to create the target routing table, the terminal may pre-parse a/data/system/packages.xml file in an ANDROID system to establish a relationship shown in Table 4.

TABLE 4

| Target app name | Target UID |
| --- | --- |
| com.example.app0 | 1000 |
| com.example.app1 | 1001 |
| com.example.app2 | 1002 |

The following describes a UID in detail.

ANDROID is a LINUX-based free and open-source operating system. A UID in a LINUX system is used to support a plurality of users, and the ANDROID system uses a UID to identify an application program. ANDROID can be considered as a driver.

The ANDROID system allocates a UID to each application program when installing the application program. If the application program is not reinstalled, a UID corresponding to the application program does not change on the terminal. /data/system/packages.xml in the ANDROID system records information about all application programs installed in the ANDROID system. A corresponding UID may be found based on a name of an application program. In other words, a name of an application program and a UID are in a one-to-one correspondence. In this application scenario, ANDROID application programs released by ANDROID application program vendors are named based on company domain names, and do not conflict.

It can be learned that, as shown in Table 4, the terminal may create the correspondence shown in Table 4 based on names of the application programs and corresponding UIDs. As shown in Table 4, for example, if the name of the target application program is "com.example.app0", a corresponding target UID is "1000". The terminal may combine Table 2, Table 3, and Table 4 shown in the foregoing embodiment, to establish a correspondence shown in Table 5.

TABLE 5

| Target UID | Identifier of target NIC | Identifier of target UPF network element |
| --- | --- | --- |
| 1000 | NIC0-0 | GateWay0-0 |
| 1001 | NIC0-1 | GateWay0-1 |
| 1002 | NIC1-0 | GateWay1-0 |

It can be learned from the correspondence shown in Table 5 that if a target UID corresponding to a name of the target application program is "1000", an identifier of a corresponding target NIC is "NIC0-0", and an identifier of a corresponding target UPF network element is "GateWay0-0". In this application scenario, the terminal may configure a corresponding identifier for any UID included in Table 5. In this application scenario, an example in which the identifier is a number is used for description. It can be learned that the terminal shown in this application scenario may create, based on the correspondence shown in Table 5, a correspondence shown in Table 6 for the target UID "1000".

TABLE 6

| Target UID | Target identifier |
| --- | --- |
| 1000 | 10 |
| 1001 | 20 |
| 1002 | 30 |

It can be learned that the terminal creates a correspondence between the target user identifier UID and the target identifier based on the correspondence shown in Table 6. The target identifier is usually shorter than the target user identifier, to reduce table lookup difficulty. It can be learned from the correspondence shown in Table 6 that if the target UID corresponding to the name of the target application program is "1000", a corresponding target identifier is "10". It can be further learned that the terminal shown in this application scenario may create a routing table shown in Table 7.

TABLE 7

| Target sequence number | Identifier of target NIC | Identifier of target UPF network element |
| --- | --- | --- |
| 40 | NIC0-0 | GateWay0-0 |

The terminal may further create a routing table shown in Table 8.

TABLE 8

| Target sequence number | Identifier of target NIC | Identifier of target UPF network element |
|---|---|---|
| 50 | NIC0-1 | GateWay0-1 |

The terminal may further create a routing table shown in Table 9.

TABLE 9

| Target sequence number | Identifier of target NIC | Identifier of target UPF network element |
|---|---|---|
| 60 | NIC1-0 | GateWay1-0 |

It can be learned that, based on the routing tables shown in Table 7 to Table 9, the terminal creates a correspondence among a target sequence number, an identifier of a target NIC, and an identifier of a target UPF network element that are included in the routing table. As shown in this application scenario, a correspondence between any application program installed on the terminal and a routing table may be created. In other words, the terminal may store a plurality of routing tables, or a plurality of tables may be summarized into one summary table.

Specifically, after a PDU session between the terminal and the target DN is successfully established, the terminal may create the routing table shown in Table 7 using an IP route command in LINUX. The IP route command is a command used by LINUX to set a route, and the terminal may create the routing table using the IP route command. More specifically, a command for the terminal to create the routing table may be as follows NIC0-0:IP route add default via GateWay0-0 dev NIC 0-0 table 40.

This command means that the terminal adds a routing table using an IP route command. The routing table includes a correspondence among a target sequence number "40", an identifier "GateWay0-0" of the target UPF network element, and an identifier "NIC0-0" of the target NIC.

Alternatively, the command for the terminal to create the routing table may be as follows NIC0-1:IP route add default via GateWay0-1 dev NIC0-1 table 50.

This command means that the terminal adds a routing table using an IP route command. The routing table includes a correspondence among a target sequence number "50", an identifier "GateWay0-1" of the target UPF network element, and an identifier "NIC0-1" of the target NIC.

Alternatively, the command for the terminal to create the routing table may be as follows NIC1-0:IP route add default via GateWay1-0 dev NIC1-0 table 60.

This command means that the terminal adds a routing table using an IP route command. The routing table includes a correspondence among a target sequence number "60", an identifier "GateWay0-1" of the target UPF network element, and an identifier "NIC0-1" of the target NIC.

Figure 5:
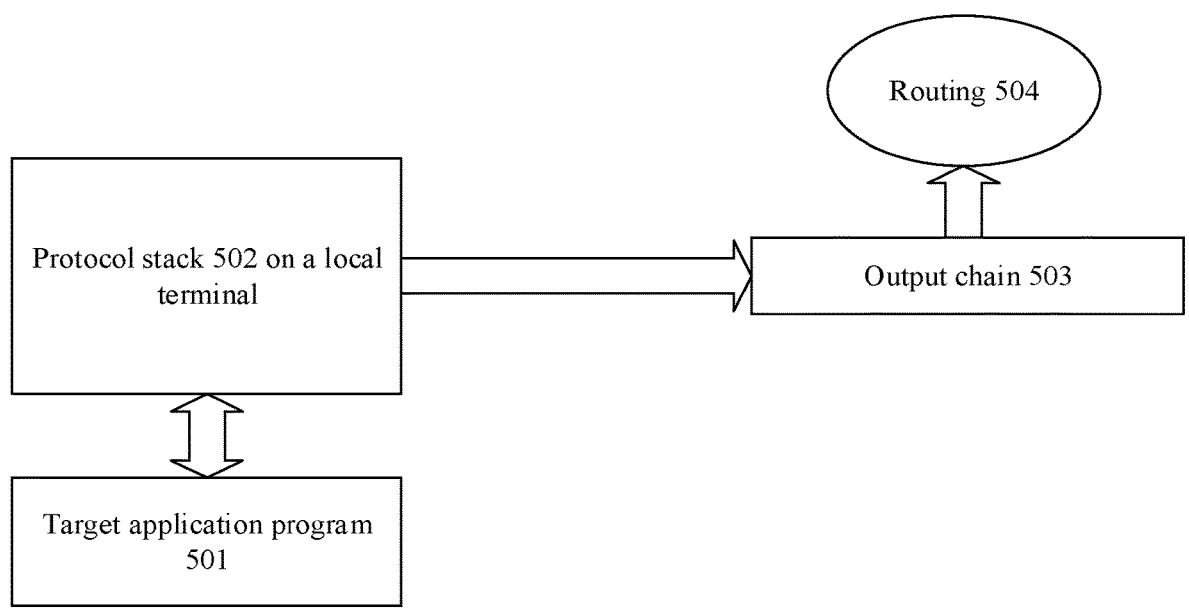
FIG. 5 is a schematic diagram of a transmission path of an uplink data packet inside a terminal according to the present disclosure.

Step 412. The terminal receives the target data packet sent by the target application program. With reference to FIG. 5, the following describes an example of a transmission path, inside the terminal, of an uplink target data packet sent by a target application program 501 run on the terminal. A target data packet sent by the target application program 501 is transmitted to a protocol stack 502 on the local terminal. The protocol stack 502 may receive the target data packet sent by the target application program.

Step 413. The terminal sets a target identifier in the target data packet. After receiving the target data packet, the protocol stack 502 may send the target data packet to an output chain 503. Specifically, a network filter (Netfilter) included in an ANDROID system of the terminal is a part of a kernel, and includes some data packet filter tables. These tables include a rule set used by the kernel to control data packet filtering processing. The terminal inserts, modifies, or deletes a data packet filtering rule into a Netfilter filter table using a tool named IP tables included in the ANDROID system. To implement data packet filtering processing, Netfilter supports four tables and five chains.

Figure 6:
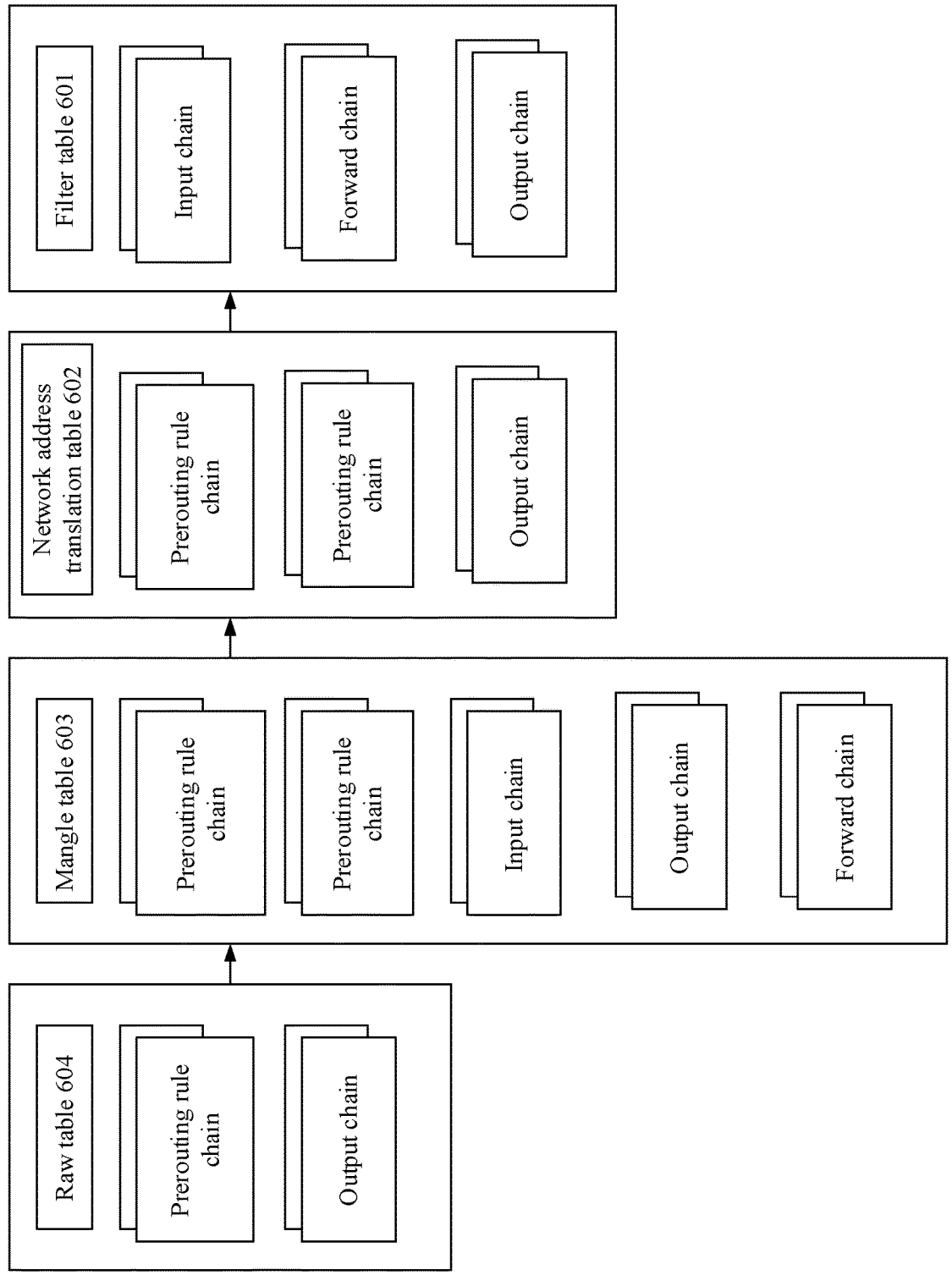
FIG. 6 is a schematic diagram of a filter table included in a network filter inside a terminal according to the present disclosure.

As shown in FIG. 6, Netfilter supports a filter table, a network address translation (NAT) table 602, a mangle table 603, and a raw table 604. The four tables may be included in driver software such as ANDROID. The filter table 601 is used to implement packet filtering, the NAT table 602 is used to implement NAT, the mangle table 603 is used to implement packet reconstruction, and the raw table 604 is used to implement data tracking processing. The filter table 601 includes three chains an input chain, a forward chain, and an output chain. The NAT table 602 includes three chains a prerouting rule chain (PREROUTING Chain), a postrouting rule chain (POSTROUTING Chain), and an OUTPUT chain. The mangle table 603 includes five chains a PREROUTING chain, a POSTROUTING chain, an INPUT chain, an OUTPUT chain, and a FORWARD chain. The raw table 604 includes two chains a PREROUTING chain and an OUTPUT chain.

More specifically, a plurality of rules may be mounted on the five chains of Netfilter such that each chain processes, according to the mounted rules, a data packet that flows through the chain. As shown in FIG. 5, it can be learned that when the target data packet sent by the target application program 501 flows through the OUTPUT chain 503 included in the mangle table 603, the OUTPUT chain 503 may perform preset processing on the target data packet according to a pre-mounted rule. The preset processing in this embodiment is. The OUTPUT chain 503 included in the mangle table 603 determines the target identifier corresponding to the target application program, and sets the target identifier in a descriptor of the target data packet.

Specifically, the IP tables of the terminal have a UID option, and a preset rule is added, using the UID option, to the OUTPUT chain 503 included in the mangle table 603 such that the OUTPUT chain 503 included in the mangle table 603 can perform the preset processing on the target data packet. More specifically, the descriptor of the target data packet includes a target field, and the target field is specially used to record a marked value. In this case, in a process of performing the preset processing, the OUTPUT chain 503 may record the target identifier in the target field. More specifically, a command used by the terminal to set the target identifier in the target data packet may be as follows.

IPtables -t mangle -A OUTPUT -m owner --uid-owner 1000 -j MARK --setmark 10.

The command means that the terminal sets a target identifier "10" in a descriptor of a target data packet with a target UID "1000". The target identifier is usually shorter than the target user identifier, to reduce table lookup difficulty such that this embodiment is more earlier to implement. Different from that the UID is used to identify an application program, the target identifier is used to identify the target routing table or the identifier of the target NIC used by the application program, and is used for a routing operation in this embodiment. This is convenient and simple.

Specifically, the terminal may determine, based on the correspondence shown in Table 4, the target UID "1000" corresponding to the name "com.example.app0" of the target application program, and the terminal may further determine the target identifier "10" based on the correspondence shown in Table 6. In this case, the terminal may set the target identifier "10" in the descriptor of the target data packet.

Alternatively, the command used by the terminal to set the target identifier in the target data packet may be as follows.

IPtables -t mangle -A OUTPUT -m owner --uid-owner 1001 -j MARK --setmark 20.

The command means that the terminal sets a target identifier "20" in a descriptor of a target data packet with a target UID "1001".

Specifically, the terminal may determine, based on the correspondence shown in Table 4, the target UID "1001" corresponding to the name "com.example.app1" of the target application program, and the terminal may further determine the target identifier "20" based on the correspondence shown in Table 6. In this case, the terminal may set the target identifier "20" in the descriptor of the target data packet.

Alternatively, the command used by the terminal to set the target identifier in the target data packet may be as follows.

IPtables -t mangle -A OUTPUT -m owner --uid-owner 1002 -j MARK --setmark 30.

The command means that the terminal sets a target identifier "30" in a descriptor of a target data packet with a target UID "1002".

Specifically, the terminal may determine, based on the correspondence shown in Table 4, the target UID "1002" corresponding to the name "com.example.app2" of the target application program, and the terminal may further determine the target identifier "30" based on the correspondence shown in Table 6. In this case, the terminal may set the target identifier "30" in the descriptor of the target data packet. A command for setting the target identifier is not limited in this application scenario, provided that the terminal can set the target identifier in the target data packet.

After the OUTPUT chain 503 included in the mangle table 603 performs the preset processing process described above on the target data packet, the terminal may perform processing at a routing 504 on the target data packet. The following describes a process in which the terminal performs processing at the routing 504 on the target data packet. The protocol stack 502, the output chain 503, and the routing 504 may be included in driver software, for example, ANDROID.

The foregoing step 401 to step 413 are pre-processing before routing. By means of pre-processing before routing, the terminal may set the target identifier in the descriptor of the target data packet, to facilitate subsequent routing table lookup and simplify operation difficulty. Different from that the UID is used to identify an application program, the target identifier is used to identify the target routing table or the identifier of the target NIC used by the application program, and is used for a routing operation in this embodiment. This is convenient and simple.

Step 414. The terminal obtains the target identifier included in the target data packet. Specifically, the terminal in this application scenario may obtain the target identifier that is set by the OUTPUT chain 503 in the descriptor of the target data packet. For specific descriptions of the target identifier, refer to the foregoing descriptions.

After the terminal obtains the target identifier included in the target data packet, the terminal may determine the target routing table used to route the target data packet such that the terminal can send the target data packet to the target DN based on the target routing table.

Specifically, the terminal stores a plurality of routing tables. The following describes how the routing 504 determines, from the plurality of routing tables (as shown in Table 7 to Table 9), the target routing table used to route the target data packet. In this application scenario, the ANDROID system may allocate a corresponding UID to each application program installed on the terminal such that a data packet sent by any application program run on the terminal carries a UID corresponding to the application program. After receiving the target data packet, the routing 504 may obtain the target UID included in the target data packet. The routing 504 may obtain a prestored correspondence shown in Table 10. As shown in Table 10, the terminal creates correspondences between different target identifiers and target sequence numbers of different routing tables.

TABLE 10

| Target identifier | Target sequence number |
| --- | --- |
| 10 | 40 |
| 20 | 50 |
| 30 | 60 |

As shown in Table 10, this application scenario is described using an example in which target identifiers and target sequence numbers that correspond to each other are equal. In another application scenario, target identifiers and target sequence numbers that correspond to each other may also be the same. This is not specifically limited in this application scenario, provided that the terminal can create correspondences between different target identifiers and sequence numbers of different routing tables.

In this application scenario, when the routing 504 determines that the target UID included in the target data packet sent in the target application scenario is "10", the routing 504 may determine, based on the correspondence shown in Table 10, that the target sequence number is "40". In this case, the routing 504 may determine that a routing table with the target sequence number "40" is the target routing table used to route the target data packet. The target routing table is that shown in Table 7.

Optionally, a command for the routing 504 to determine the target routing table may be as follows.

IP rule add fwmark 10 table 40.

This command means that any target data packet with the target identifier "10" is routed based on a routing table with the target sequence number "40".

Optionally, alternatively, the command for the routing 504 to determine the target routing table may be as follows.

IP rule add fwmark 20 table 20.

This command means that any target data packet with the target identifier "20" is routed based on a routing table with the target sequence number "20".

Optionally, alternatively, the command for the routing 504 to determine the target routing table may be as follows.

IP rule add fwmark 30 table 60.

This command means that any target data packet with the target identifier "30" is routed based on a routing table with the target sequence number "60".

Step 415. The terminal determines the target NIC corresponding to the target identifier. Specifically, when the terminal determines the target routing table, the terminal may determine the identifier of the target NIC included in the target routing table, and further determine the target NIC.

In this application scenario, an example in which the target routing table is the routing table shown in Table 7 is used. In this case, the terminal determines that the identifier of the target NIC is "NIC0-0" such that the terminal determines that the target NIC is a NIC with the identifier "NIC0-0".

For a specific execution process of step 416 to step 419 shown in this application scenario, refer to step 316 to step 319 in the embodiment shown in FIG. 3A, FIG. 3B, and FIG. 3C. Details are not described.

Figure 7:
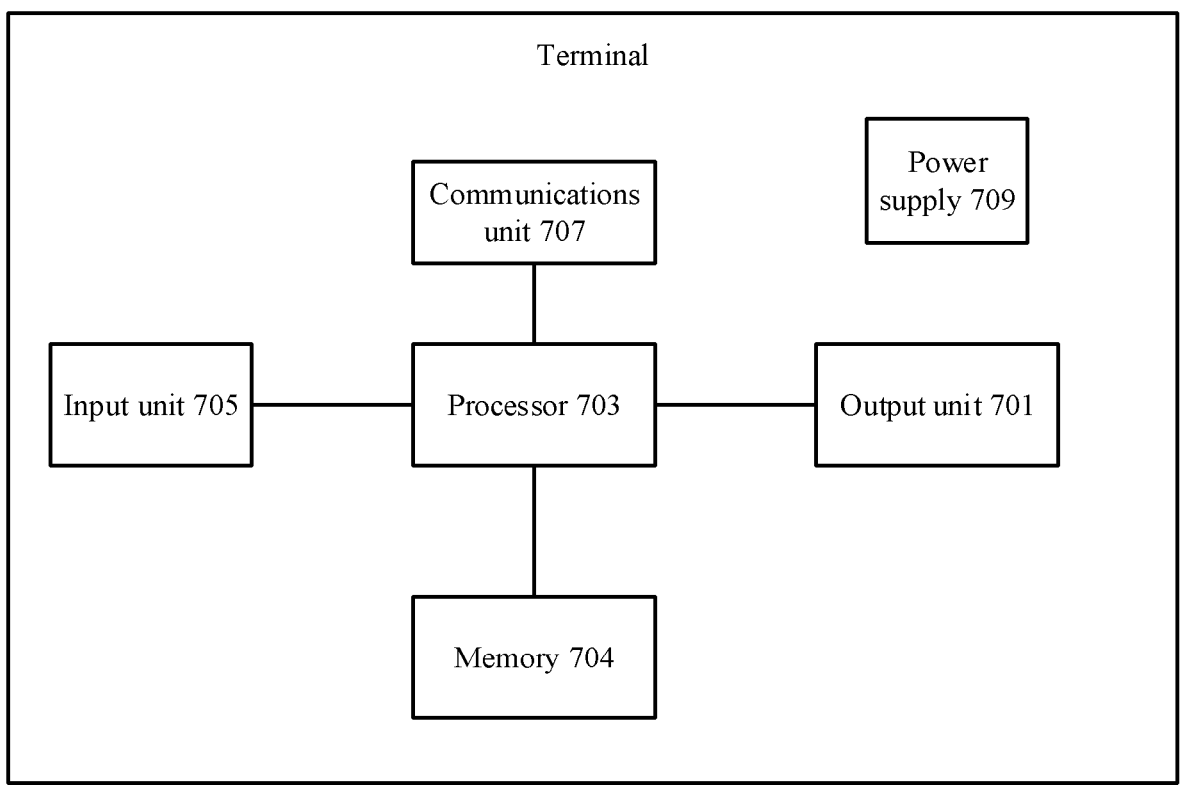
FIG. 7 is a schematic structural diagram of an embodiment of a terminal according to the present disclosure.

The method in the embodiment corresponding to FIG. 3A, FIG. 3B, and FIG. 3C or FIG. 4A, FIG. 4B, and FIG. 4C may be implemented by a processor by executing a software program. The software program for implementing a related function may be a driver different from an application program. The driver may include various modules mentioned in the foregoing embodiments, such as a NIC or various tables mentioned above, to implement a routing operation. The driver is specifically an ANDROID program involved in FIG. 4A, FIG. 4B, and FIG. 4C. The driver may enable an open source program or a closed source program to implement the method in the foregoing embodiment, to route a data packet corresponding to an application program or another program to the target data network. With reference to FIG. 7, the following describes a specific structure of the terminal using an example from a perspective of physical hardware. FIG. 7 is a schematic structural diagram of an embodiment of a terminal according to the present disclosure.

The terminal includes components such as an input unit 705, a processor 703, an output unit 701, a communications unit 707, a memory 704, and a power supply 709.

These components communicate with each other through one or more buses or other types of connection lines. A person skilled in the art may understand that a structure of the terminal shown in FIG. 7 imposes no limitation on the present disclosure. The structure may be a bus structure or a star structure, and may include more or fewer parts than those shown in the figure, or combine some parts, or have different part arrangements.

The output unit 701 is configured to output a to-be-displayed image. The image output unit 701 is configured to output text, a picture, and/or a video. The output unit 701 may include a display panel, such as a liquid crystal display (LCD), an organic light-emitting diode (OLED), or a field emission display (FED).

The processor 703 is a control center of the terminal, and is connected to all parts of the entire terminal using various interfaces and lines. The processor 703 runs or performs a software program and/or a module stored in the memory and invokes data stored in the memory, to implement various functions of the terminal and/or process data. The processor 703 may include an integrated circuit (IC), for example, may include a single packaged IC, or may include a plurality of connected packaged ICs with a same function or different functions.

For example, the processor 703 may include a central processing unit (CPU), or may include a combination of a graphics processing unit (GPU), a digital signal processor (DSP), and a control chip (for example, a baseband chip) in a communications unit. In an implementation of the present disclosure, the CPU may be a single computing core, or may include a plurality of computing cores.

The memory 704 is configured to store code and data, and the code is run by the processor 703. Specifically, the memory 704 may be configured to store a software program and a module. The processor 703 runs the software program and the module that are stored in the memory 704, to execute various function applications of the terminal and implement data processing, which specifically includes method procedures in the foregoing embodiments. The memory 704 mainly includes a program storage area and a data storage area. The program storage area may store an operating system and an application program, such as a sound playback program or an image play program, required by at least one function. The data storage area may store data (such as audio data and a phone book) and the like that are created based on usage of the terminal. It should be noted that in the foregoing embodiments, the application programs are used as an example for description. However, an application program in an embodiment may also be another software program, for example, a software program run on a device other than a CPU. For example, the software program may be a communications software program, an audio software program, a video software program, an artificial intelligence software program, or a power consumption management software program.

The input unit 705 is configured to implement interaction between a user and the terminal and/or input information to the terminal. For example, the input unit 705 may receive digit or character information entered by a user, to generate signal input related to a user setting or function control. In a specific implementation of the present disclosure, the input unit 705 may be a touchscreen, or may be another man-machine interface such as a physical input key or a microphone, or may be another external information obtaining apparatus such as a camera.

The communications unit 707 is configured to establish a communications channel such that the terminal is connected to a remote server using the communications channel and downloads media data from the remote server. The communications unit 707 may include a communications module such as a wireless local area network (WLAN) module, a BLUETOOTH module, or a baseband module, and a radio frequency (RF) circuit corresponding to the communications module configured to perform wireless local area network communication, BLUETOOTH communication, infrared communication, and/or cellular communications system communication. Specifically, the communications unit 707 may include a baseband unit and a RF unit.

The power supply 709 is configured to supply power to different parts of the terminal to keep the terminal running. Generally, the power supply 709 may be a built-in battery, such as a common lithium-ion battery or a nickel-metal hydride (NiMH) battery, or may include an external power supply that directly supplies power to the terminal, such as an alternating current (AC) adapter. In some implementations of the present disclosure, the power supply 709 may further have a wider definition. For example, the power supply 709 may further include a power management system, a charging system, a power fault detection circuit, a power converter or inverter, a power status indicator (such as a light emitting diode), and any other components that are related to power generation, management, and distribution of the terminal.

An embodiment of the present disclosure further provides a computer-readable storage medium. The computer-readable storage medium includes an instruction. When the instruction is run on a terminal or a processor, the terminal or the processor is enabled to perform the data routing method in the foregoing embodiments. For a specific execution process of the data routing method, refer to the foregoing descriptions. Details are not described again.

An embodiment of the present disclosure further provides a computer program product including an instruction. The computer program product is a driver run on a terminal system. The computer program product used as a driver is a program that can enable a terminal to communicate with a target network element. When the computer program product is run on the terminal or a processor, the terminal or the processor is enabled to perform the data routing method in the foregoing embodiments. For a specific execution process of the data routing method, refer to the foregoing descriptions. Details are not described again.

Figure 8:
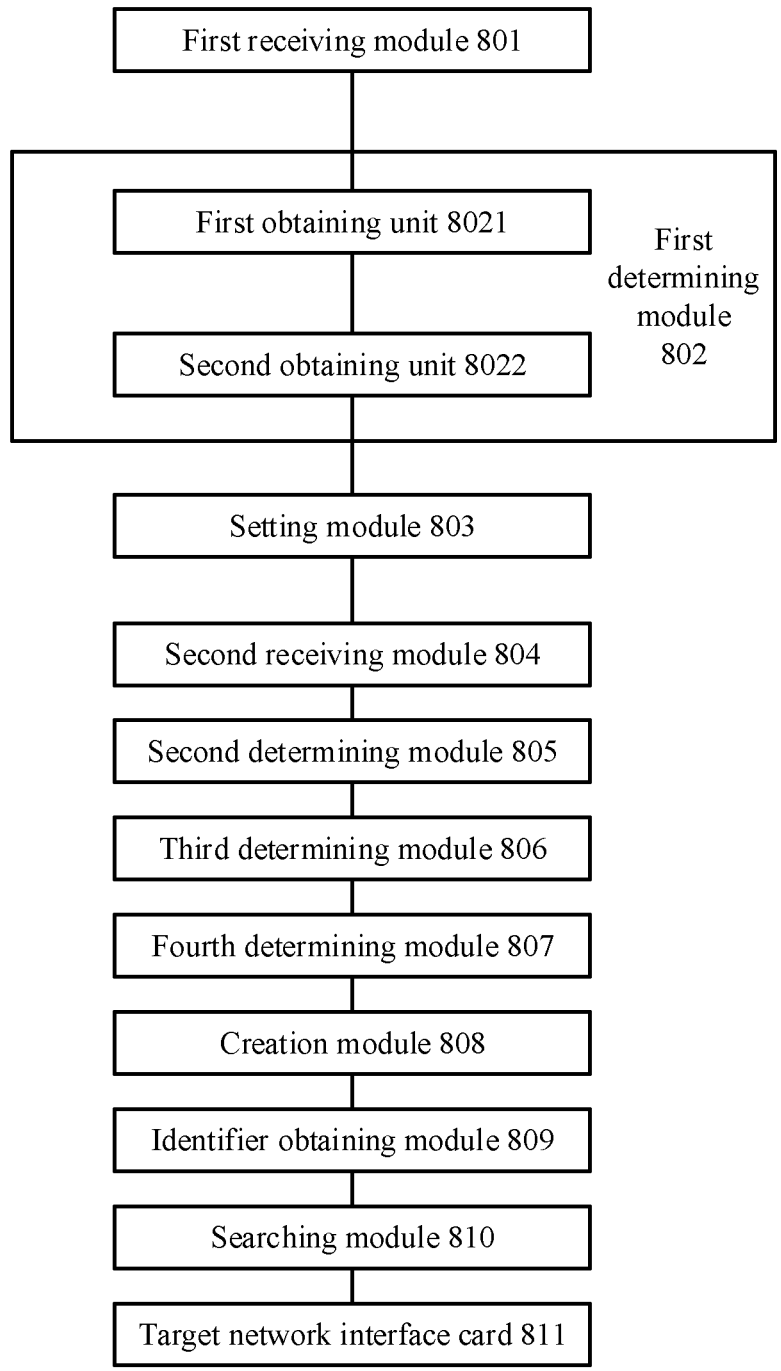
FIG. 8 is a schematic structural diagram of another embodiment of a terminal according to the present disclosure.

With reference to FIG. 8, the following describes a specific structure of a data routing apparatus using an example from a perspective of a functional module. The data routing apparatus is configured to perform the data routing method in the foregoing embodiments. For a specific execution process, refer to the foregoing description. Details are not described again.

The data routing apparatus further includes a first receiving module 801 configured to receive the target data packet sent by the target program, a first determining module 802 configured to determine the target identifier corresponding to the target program, where specifically, the first determining module 802 includes a first obtaining module 8021 configured to obtain a target UID carried in the target data packet, and a second obtaining unit 8022 configured to obtain, based on a first correspondence, the target identifier corresponding to the target UID, where the first correspondence includes correspondences between UIDs of different programs and different identifiers, a setting module 803 configured to set the target identifier in a descriptor of the target data packet, a second receiving module 804 configured to receive a terminal route selection policy list, where the terminal route selection policy list indicates that there is at least one network slice, and any one of the at least one network slice includes at least one data network, a second determining module 805 configured to determine the target network slice and the target data network based on the terminal route selection policy list, a third determining module 806 configured to determine the target network element corresponding to the target data network, a fourth determining module 807 configured to determine the target NIC corresponding to the target network element, a creation module 808 configured to create the target routing table based on the correspondence between the target NIC and the target network element, and an identifier obtaining module 809 configured to obtain the target identifier carried in the target data packet, where the target identifier is an identifier corresponding to the target program, and the target program is used to generate the target data packet, where specifically, the identifier obtaining module 809 is further configured to obtain the target routing table corresponding to the target identifier, where the target routing table includes the correspondence between the target NIC and the target network element, a searching module 810 configured to determine a target NIC 811 that corresponds to the target identifier and that has a data transmission function, where the target NIC 811 corresponds to a target data network, the target data network belongs to a target network slice, and a service type supported by the target network slice corresponds to a service type of a session initiated by the target program, and the target NIC 811 configured to send the target data packet to the target data network, where the target NIC 811 is further configured to send the target data packet to the target network element, and the target network element is configured to forward the target data packet to the target data network.

Beneficial effects of using the data routing apparatus in this embodiment are as follows. When accessing a plurality of DNs based on a requirement of a service type, the data routing apparatus may determine a target routing table corresponding to any target application program run by the terminal. In this case, the data routing apparatus may determine, based on the target routing table, a path on which the target data packet of the target application program is sent, to accurately send the target data packet of the target application program to the DN that can serve the target application program. In addition, using the method in this embodiment, a complex change to code of the target application program is not needed, and modification in code of a core library of an operating system is also avoided, in other words, an application program manufacturer can send a data packet of an application program to a corresponding DNN without making a change to the application program, effectively ensuring that the data packet is successfully sent.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiments are merely examples. For example, the unit division is merely logical function division and may be other division in an embodiment. For example, a plurality of units or components may be combined or integrated into another system, or some features may be ignored or not performed. In addition, the displayed or discussed mutual coupling or a direct coupling or a communication connection may be implemented using some interfaces. An indirect coupling or a communication connection between the apparatuses or units may be implemented in an electrical form, a mechanical form, or in another form.

In addition, functional units in the embodiments of the present disclosure may be integrated into one processing unit, or each of the units may exist alone physically, or two or more units are integrated into one unit. The foregoing integrated units may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of the present disclosure essentially, or the part contributing to other approaches, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, and an optical disc.

The foregoing embodiments are merely intended for describing the technical solutions of the present disclosure, but not for limiting the present disclosure. Although the present disclosure is described in detail with reference to the foregoing embodiments, a person of ordinary skill in the art should understand that he or she may still make modifications to the technical solutions described in the foregoing embodiments or make equivalent replacements to some technical features thereof, without departing from the spirit and scope of the technical solutions of the embodiments of the present disclosure.

What is claimed is:

1. A data routing method implemented by a terminal, the data routing method comprising:
receiving a target data packet from a target program installed on the terminal;
determining a target identifier corresponding to the target program at least in part by:
obtaining a target user identifier (UID) in the target data packet; and
obtaining the target identifier corresponding to the target UID based on correspondences between user identifiers (UIDs) of different programs and different identifiers, wherein the correspondences comprise a first correspondence between the target UID and the target identifier;
setting the target identifier in a descriptor of the target data packet;
obtaining the target identifier from the target data packet, wherein the target program generates the target data packet;
determining a target network interface card that corresponds to the target identifier and comprises a data transmission function, wherein the target network interface card corresponds to a target data network, wherein the target data network belongs to a target network slice, and wherein the target network slice supports a service type corresponding to a session initiated by the target program; and
sending the target data packet to the target data network using the target network interface card.

2. The data routing method of claim 1, further comprising:
obtaining a target routing table corresponding to the target identifier, wherein the target routing table comprises a correspondence between the target network interface card and a target network element; and
sending the target data packet to the target network element using the target network interface card.

3. The data routing method of claim 2, wherein before determining the target network interface card that corresponds to the target identifier, the data routing method further comprises:
receiving a terminal route selection policy list that indicates there is at least one network slice comprising at least one data network;
determining the target network slice and the target data network based on the terminal route selection policy list;
determining the target network element corresponding to the target data network;
determining the target network interface card corresponding to the target network element; and
creating the target routing table based on the correspondence between the target network interface card and the target network element.

4. The data routing method of claim 1, wherein the descriptor includes a target field, and wherein the target field records a marked value.

5. The data routing method of claim 1, wherein the target network slice comprises a plurality of pieces of Single Network Slice Selection Assistance Information (S-NSSAI).

6. The data routing method of claim 1, wherein the target data network is an Internet Protocol (IP) multimedia subsystem (IMS).

7. The data routing method of claim 1, wherein the target program is an application program.

8. A terminal, comprising:
a processor; and
a memory coupled to the processor and storing instructions that, when executed by the processor, cause the terminal to be configured to:
receive a target data packet from a target program installed on the terminal;
determine a target identifier corresponding to the target program at least in part by:
obtaining a target user identifier (UID) in the target data packet; and
obtaining the target identifier corresponding to the target UID based on correspondences between user identifiers (UIDs) of different programs and different identifiers, wherein the correspondences comprise a first correspondence between the target UID and the target identifier;
set the target identifier in a descriptor of the target data packet;
obtain the target identifier from the target data packet wherein the target program generates the target data packet;
determine a target network interface card that corresponds to the target identifier and comprises a data transmission function, wherein the target network interface card corresponds to a target data network, wherein the target data network belongs to a target network slice, and wherein the target network slice supports a service type corresponding to a session initiated by the target program; and
send the target data packet to the target data network using the target network interface card.

9. The terminal of claim 8, wherein the instructions further cause the terminal to be configured to:
obtain a target routing table corresponding to the target identifier, wherein the target routing table comprises a correspondence between the target network interface card and a target network element; and
send the target data packet to the target network element using the target network interface card.

10. The terminal of claim 9, wherein before the instructions cause the processor to determine the target network interface card that corresponds to the target identifier, the instructions further cause the terminal to be configured to:
receive a terminal route selection policy list that indicates there is at least one network slice comprising at least one data network;
determine the target network slice and the target data network based on the terminal route selection policy list;
determine the target network element corresponding to the target data network;
determine the target network interface card corresponding to the target network element; and
create the target routing table based on the correspondence between the target network interface card and the target network element.

11. The terminal of claim 8, wherein the descriptor includes a target field, and wherein the target field records a marked value.

12. The terminal of claim 8, wherein the target network slice comprises a plurality of pieces of Single Network Slice Selection Assistance Information (S-NSSAI).

13. The terminal of claim 8, wherein the target data network is an Internet Protocol (IP) multimedia subsystem (IMS).

14. The terminal of claim 8, wherein the target program is an application program.

15. A computer program product comprising computer-executable instructions that are stored on a non-transitory computer-readable medium and that, when executed by a processor, cause a terminal to:
   receive a target data packet from a target program installed on the terminal;
   determine a target identifier corresponding to the target program at least in part by:
      obtaining a target user identifier (UID) in the target data packet; and
      obtaining the target identifier corresponding to the target UID based on correspondences between user identifiers (UIDs) of different programs and different identifiers, wherein the correspondences comprise a first correspondence between the target UID and the target identifier;
   set the target identifier in a descriptor of the target data packet;
   obtain the target identifier from the target data packet, wherein the target program generates the target data packet;
   determine a target network interface card that corresponds to the target identifier and comprises a data transmission function, wherein the target network interface card corresponds to a target data network, wherein the target data network belongs to a target network slice, and wherein the target network slice supports a service type corresponding to a session initiated by the target program; and
   send the target data packet to the target data network using the target network interface card.

16. The computer program product of claim 15, wherein the computer-executable instructions further cause the terminal to:
   obtain a target routing table corresponding to the target identifier, wherein the target routing table comprises a correspondence between the target network interface card and a target network element; and
   send the target data packet to the target network element using the target network interface card.

17. The computer program product of claim 16, wherein before the computer-executable instructions cause the terminal to determine the target network interface card that corresponds to the target identifier, the computer-executable instructions further cause the terminal to:
   receive a terminal route selection policy list that indicates there is at least one network slice comprising at least one data network;
   determine the target network slice and the target data network based on the terminal route selection policy list;
   determine the target network element corresponding to the target data network;
   determine the target network interface card corresponding to the target network element; and
   create the target routing table based on the correspondence between the target network interface card and the target network element.

18. The computer program product of claim 16, wherein before the computer-executable instructions cause the terminal to determine the target network interface card that corresponds to the target identifier, the computer-executable instructions further cause the terminal to:
   receive a terminal route selection policy list that indicates there is at least one network slice comprising at least one data network;
   determine the target network slice and the target data network based on the terminal route selection policy list;
   determine the target network element corresponding to the target data network;
   determine the target network interface card corresponding to the target network element; and
   create the target routing table based on the correspondence between the target network interface card and the target network element.

19. The computer program product of claim 15, wherein the target data network is an Internet Protocol (IP) multimedia subsystem (IMS).

20. The computer program product of claim 15, wherein the target program is an application program.

* * * * *